(12) United States Patent
Vogt et al.

US008865834B2

(10) Patent No.: US 8,865,834 B2
(45) Date of Patent: Oct. 21, 2014

(54) ADHESIVE POLYMER COMPOSITION

(75) Inventors: Heinz Vogt, Frankfurt (DE); Shahram Mihan, Bad Soden (DE); Gerd Mannebach, Münstermaifeld (DE); Gerhardus Meier, Frankfurt (DE); Joachim Berthold, Grassau (DE); Manfred Hecker, Neustadt (DE)

(73) Assignee: Basell Polyolefine GmbH, Wesseling (DE)

( * ) Notice: Subject to any disclaimer, the term of this patent is extended or adjusted under 35 U.S.C. 154(b) by 588 days.

(21) Appl. No.: 12/735,689

(22) PCT Filed: Feb. 18, 2009

(86) PCT No.: PCT/EP2009/001164
§ 371 (c)(1),
(2), (4) Date: Oct. 28, 2010

(87) PCT Pub. No.: WO2009/103516
PCT Pub. Date: Aug. 27, 2009

(65) Prior Publication Data
US 2011/0045295 A1 Feb. 24, 2011

Related U.S. Application Data

(60) Provisional application No. 61/067,655, filed on Feb. 29, 2008.

(30) Foreign Application Priority Data

Feb. 18, 2008 (EP) .................................... 08002944

(51) Int. Cl.
| C08L 51/06 | (2006.01) |
| C08L 23/08 | (2006.01) |
| C09J 151/06 | (2006.01) |
| C09J 123/08 | (2006.01) |
| B32B 7/12 | (2006.01) |
| C08J 5/18 | (2006.01) |
| B29C 41/04 | (2006.01) |
| B32B 1/08 | (2006.01) |
| C08F 255/02 | (2006.01) |
| B32B 15/08 | (2006.01) |
| C08F 10/00 | (2006.01) |
| H01B 3/44 | (2006.01) |
| B29C 41/00 | (2006.01) |
| C08F 4/659 | (2006.01) |
| C08F 210/02 | (2006.01) |
| C08F 210/16 | (2006.01) |
| C08F 4/6592 | (2006.01) |
| C08L 23/04 | (2006.01) |

(52) U.S. Cl.
CPC ............ *C08F 255/02* (2013.01); *C08L 51/06* (2013.01); C08L 23/0869 (2013.01); *C09J 123/0869* (2013.01); *B32B 7/12* (2013.01); C08F 4/65912 (2013.01); *C09J 151/06* (2013.01); C08F 210/02 (2013.01); *C08J 5/18* (2013.01); B29C 41/04 (2013.01); *B32B 1/08* (2013.01); B29K 2995/0088 (2013.01); C08F 210/16 (2013.01); C08F 4/65925 (2013.01); *B32B 15/08* (2013.01); C08L 23/04 (2013.01); C08F 4/65916 (2013.01); *C08F 10/00* (2013.01); C08J 2323/08 (2013.01); *H01B 3/441* (2013.01); B29C 41/003 (2013.01); B29K 2023/06 (2013.01)
USPC .................. 525/70; 525/78; 525/80; 525/240; 525/301; 525/302

(58) Field of Classification Search
CPC ..... C08L 51/06; C08L 23/04; C08L 23/0869; C09J 151/06; C09J 123/04; C09J 123/0869; C09D 151/06; C09D 123/04; C09D 123/0869; H01B 3/441
USPC ............. 525/70, 71, 74, 78, 80, 85, 298, 301, 525/240, 302; 526/352
See application file for complete search history.

(56) References Cited

U.S. PATENT DOCUMENTS

| 3,242,150 A | 3/1966 | Scoggin |
| 3,248,179 A | 4/1966 | Norwood |
| 3,862,265 A | 1/1975 | Steinkamp et al. |
| 3,953,655 A | 4/1976 | Steinkamp et al. |
| 4,001,172 A | 1/1977 | Steinkamp et al. |
| 4,576,993 A * | 3/1986 | Tamplin et al. ............... 525/240 |

(Continued)

FOREIGN PATENT DOCUMENTS

| EP | 0247877 A2 * | 12/1987 |
| EP | 0347129 A1 | 12/1989 |
| EP | 0 416 815 B1 | 8/1990 |
| EP | 0 632 063 B1 | 5/1994 |
| EP | 0561 479 B1 | 11/1996 |

(Continued)

OTHER PUBLICATIONS

L. Wild, T. R. Ryle, D. C. Knobeloch and I, R. Peat, "Determination of Branching Distributions in Polyethylene and Ethylene Copolymers," *Journal of Polymer Science: Polymer Physics Edition*, vol. 20, (1982), pp. 441-455.

(Continued)

*Primary Examiner* — Irina S Zemel
*Assistant Examiner* — Jeffrey Lenihan

(57) ABSTRACT

A novel adhesive composition suitable for composing multi-layered coatings onto large, industrial equipment such as pipeline tubes is devised. The composition is a blend based on a polyethylene which determines the blend's favorable properties, which polyethylene itself can be used further in coating cables and for producing moldings, especially rotomoulded articles.

16 Claims, 2 Drawing Sheets

(56) References Cited

U.S. PATENT DOCUMENTS

| | | | |
|---|---|---|---|
| 4,877,685 | A | 10/1989 | Bergstrom et al. |
| 4,950,541 | A * | 8/1990 | Tabor et al. ............. 428/373 |
| 5,008,204 | A | 4/1991 | Stehling |
| 5,324,800 | A | 6/1994 | Welborn, Jr. et al. |
| 5,326,835 | A | 7/1994 | Ahvenainen et al. |
| 5,565,534 | A | 10/1996 | Aulbach et al. |
| 5,698,642 | A | 12/1997 | Govoni et al. |
| 5,710,297 | A | 1/1998 | Weller et al. |
| 5,744,250 | A | 4/1998 | Lee et al. |
| 5,770,753 | A | 6/1998 | Kuber et al. |
| 5,840,948 | A | 11/1998 | Rohrmann et al. |
| 6,087,291 | A | 7/2000 | Speca et al. |
| 6,166,142 | A | 12/2000 | Zhang et al. |
| 6,255,246 | B1 | 7/2001 | Devore et al. |
| 6,417,302 | B1 | 7/2002 | Bohnen |
| 6,462,212 | B1 | 10/2002 | Wu |
| 6,548,442 | B1 | 4/2003 | McDaniel et al. |
| 6,589,905 | B1 | 7/2003 | Fischer et al. |
| 6,645,588 | B1 | 11/2003 | Leiden et al. |
| 7,053,160 | B1 | 5/2006 | Bingel et al. |
| 1,299,438 | A1 | 4/2007 | Vogt et al. |
| 7,198,852 | B1 | 4/2007 | Vogt et al. |
| 2008/0045679 | A1 | 2/2008 | Davey et al. |
| 2009/0082531 | A1 | 3/2009 | Chai |

FOREIGN PATENT DOCUMENTS

| | | |
|---|---|---|
| EP | 0751156 A2 | 1/1997 |
| EP | 0896044 A1 | 2/1999 |
| EP | 1 739 691 | 12/2008 |
| EP | 1 316 598 | 5/2010 |
| JP | 2004217704 A | 8/2004 |
| RU | 2178437 C2 | 1/2002 |
| WO | WO 91/09882 | 7/1991 |
| WO | WO 93/03093 | 2/1993 |
| WO | WO 98/27124 | 6/1998 |
| WO | WO 98/40419 | 9/1998 |
| WO | WO-200202661 A1 | 1/2002 |
| WO | WO 03/046101 | 6/2003 |
| WO | WO 2005/103095 | 11/2005 |
| WO | WO-2006114210 A1 | 11/2006 |
| WO | WO-2006120418 A1 | 11/2006 |
| WO | WO-2006131265 A1 | 12/2006 |
| WO | WO-2008002379 A2 | 1/2008 |
| WO | WO-2008152935 A1 | 12/2008 |
| WO | WO-2009103516 A2 | 8/2009 |

OTHER PUBLICATIONS

Andrew J. Peacock, Handbook of Polyethylene, Marcel Dekker, Inc., New York, NY (2000), pp. 7-10.

Z. Grubisic, P. Rempp, and H. Benoit, "A Universal Calibration for Gel Permeation Chromatography," *J. Polymer Sci. Phys.*, vol. 5, (1967), p. 753-759.

Raff and Doak, *High Polymers*, vol. XX, Inter Science Publishers, John Wiley & Sons, 1965, pp. 442-443.

Wolfgang Holtrup, "Zur Fraktionierung von Polymeren durch Direktextraktion," *Makromol. Chem.* 178, pp. 2335-2349 (1977).

James C. Randall, "A Review of High Resolution Liquid Carbon Nuclear Magnetic Resonance Characterizations of Ethylene-Based Polymers," *JMS-Rev. Macromol. Chem. Phys.*, C29 (2 & 3), pp. 201-317 (1989).

Leslie Wild, "Temperature Rising Elution Fractionation," *Advances in Polymer Science 98*, pp. 1-47 (1990).

Simon Pang and Alfred Rudin, "Chromatography of Polymers, Size-Exclusion Chromatographic Assessment of Long-Chain Branch Frequency in Polyethylenes," *American Chemical Society Symposium Series*, (1993) pp. 254-269.

Helga Wiesenfeldt, Annette Reinmuth, Elke Barsties, Kaspar Evertz and Hans-Herbert Brintzinger, "ansa-Metallocene derivatives," *Journal of Organometallic Chemistry*, 369 (1989) pp. 359-370.

Steven H. Strauss, "The Search for Larger and More Weakly Coordinating Anions," *Chem. Rev.* 1993, 93, pp. 927-942.

Brooke L. Small, Maurice Brookhart, and Alison M. A. Bennett,"Highly Active Iron and Cobalt Catalysts for the Polymerization of Ethylene," *J. Am. Chem. Soc.* 1998, 120, pp. 4049-4050.

George J. P. Britovsek et al., "Novel olefin polymerization catalysts based on iron and cobalt," *Chem. Commun.*, 1998, pp. 849-850.

C. J. Carman, R. A. Harrington, and C. E. Wilkes, "Monomer Sequence Distribution in Ethylene-Propylene Rubber Measured by C NMR, 3. Use of Reaction Probability Model," *Macromolecules*, vol. 10, No. 3, May-Jun. 1977, pp. 536-544.

Masahiro Kakugo, Yukio Naito, Kooji Mizunuma, and Tasuya Miyatake, "C NMR Determination of Monomer Sequence Distribution in Ethylene-Propylene Copolymers Prepared with 8-TiC13-Al(C2H5)2C1," *Macromolecules*, 1982, vol. 15, pp. 1150-1152.

\* cited by examiner

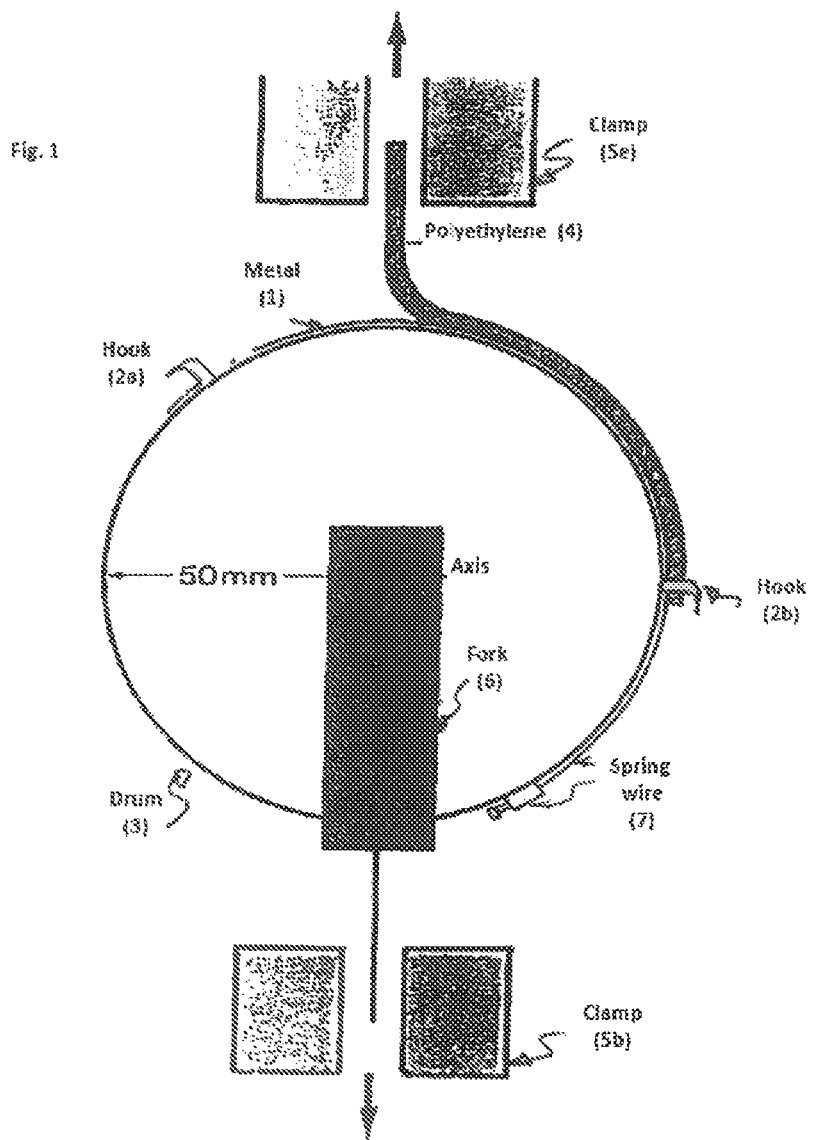

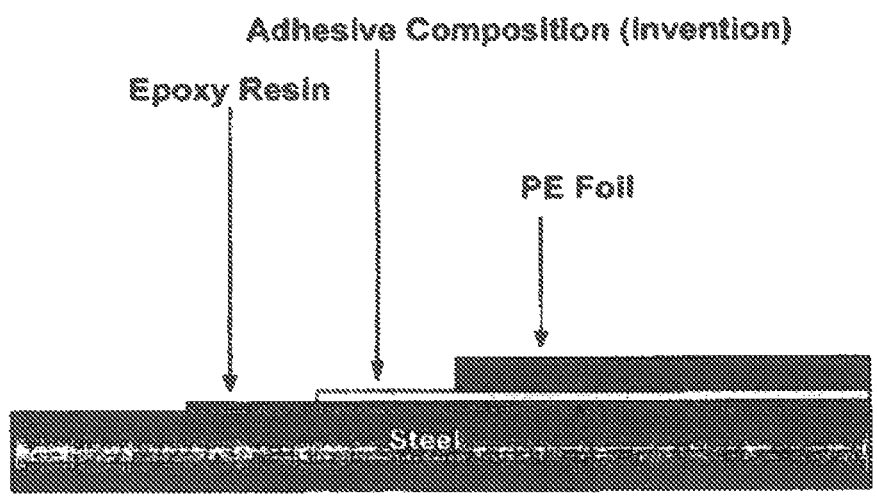

ADHESIVE POLYMER COMPOSITION

CROSS-REFERENCE TO RELATED APPLICATIONS

This application is the U.S. national stage under 35 U.S.C. §371 of International Application PCT/EP2009/001164, filed Feb. 18, 2009, claiming priority to EP Patent Application No. 08002944.0, filed Feb. 18, 2008 and U.S. Provisional Application No. 61/067,655, filed Feb. 29, 2008; the disclosures of International Application PCT/EP2009/001164, EP Patent Application No. 08002944.0, and U.S. Provisional Application No. 61/067,655, each as filed, are incorporated herein by reference.

The present invention relates to a novel composite adhesive, and products obtained from use of such composition for generating an adhesive layer of a multilayer structure of a pipe such as a coated steel pipe for industrial pipelines.

Multilayer structures comprising two, three, four, five or more layers are known for many applications such as the protective coating of pipes. In these multilayer structures different layers most often consist of different materials which accordingly have different physical and chemical properties, which different materials still need to be affixed by means of an intersecting adhesive layer. Said adhesive layer must mediate the bond in between the materials, both complying with their chemical properties as well as with the process employed for coating of the steel pipe. For instance, the innermost layer usually is constituted by an epoxide resin whose polymerization or hardening takes place when applied to a heated steel surface of a raw pipe. Immediately thereafter in the manufacturing line, the pipe moving along the fixed manufacturing line steadily, the hot, pipe is coated with a freshly prepared, extruded film that is going to form the intersecting adhesive layer on top of which immediately, an outer protective layer of a massive, insulating high density polyethylene or polypropylene foil is continuously applied. Accordingly, the adhesive must possess excellent processing properties as well as it must retain its adhesive properties over a wider temperature range. However, another aspect is that for allowing of engineering pipes that have already installed, the adhesive layer must have specific properties allowing of simple dismantlement of the outer protective insulation from the epoxide coated surface. For such, it is utterly important that the adhesive layer not only provides strong bonding but also shows cohesive fracture upon removal of the outermost insulating foil, not tearing off the epoxide layer alike. Such disbonding of the pipe's coating may be required in pipeline maintenance, e.g. when new valves or branches are engineered into an existing pipeline or when damaged parts of the outer insulation need to be replaced. A further problem is that the heating temperature regulating the polymerization of the epoxy resin as well as affecting the adhesive bonding of the film adhesive may vary considerably during the process, giving rise to fluctuations in the surface temperature and consequently the hardness of the fresh epoxid layer at the time the adhesive film is applied. This simply ensues from the large dimensions of e.g. large industrial pipeline pipes, which are to be both rotated and constantly laterally moved along the manufacturing line during the process. Hence a suitable adhesive must not be affected by such, for allowing of a robust manufacturing process.

EP-247877 A describes an adhesive copolymer of ethylene with butyl-acrylat which was grafted with fumaric acid. Apart from its excessive adhesiveness, which make it hard to handle, it rapidly looses its adhesive strength when temperature rises. Above 60° C., it is ineffective. EP-1049 751 A describes an adhesive composition made from polar polyethylene-acrlyat copolymer blended with metallocene-produced LLPDE of MWD~1-2, which LLPDE only was grafted with maleic acid anhydride. The temperature stability of the adhesive strength of the ensuing resin still proved dissatisfactory.

WO 03/046101 describes, decisively for use in steel pipe coating, an adhesive blend based on 50-90% (w/w) of an apolar polyethylene homo- or preferably copolymer produced by a single site catalyst such as the zirconocene and/or titanocene catalyst used in the examples' section, yielding a narrow MWD of ~2. This narrow MWD-polyethylene was blended with an elastomeric polyethylene copolymer having polar co-monomer groups such as alkylacrylates, the blend further being grafted with maleic acid anyhydride. According to the examples cited, such blend using afore said metallocene-derived copolymer improved over a similar blend using a traditional Ziegler-Natter product instead. In particular the loss of adhesive strength upon rise of temperature up to 95° C. was clearly diminished at least in relation. In absolute numbers though, the metallocene-based blend still suffered from a loss of >50% in peel strength at 70° C. already and consequently failed to provide an at least minimally satisfactory temperature performance.

It is an object of the present invention to define an adhesive composition that avoids the disadvantages of the prior art and has good adhesive properties over a broad temperature range and/or on a broad range of substrate qualities and, optionally, has good processability upon film extrusion. This object is achieved by the adhesive composition of independent claim 1 and the products obtained from using such composition for generating an adhesive layer of a multilayer structure of a pipe such as a coated steel pipe for industrial pipelines.

This object is solved by the adhesive composition of the independent claim 1. It has been surprisingly found that the properties sought may be suitably achieved when generating, by means of a selected catalyst systems, for blending an apolar, narrow-MWD ethylene copolymer further having suitable density, melt-flow index in combination with a high contents of terminal vinyl groups —CH═CH$_2$ in said copolymer. It may be hypothized that for adhesion on a freshly polymerized, hot epoxy layer, such terminal vinyl groups contribute some degree of reactive crosslinking with the epoxide layer in situ whilst surprisingly not affecting the extrusion process which requires elevated processing temperature, too.

According to the present invention, an adhesive polymer composition for film extrusion is devised comprising a) 50%-95% (w/w), preferably 55%-85% (w/w) of a polyethylene homo- and/or ethylene copolymer which is a copolymer of ethylene with $C_3$-$C_{20}$-alkene, which polyethylene has a molar mass distribution width $M_w/M_n$ of from 6 to 30, a density of from 0.93 to 0.955 g/cm$^3$, a weight average molar mass $M_w$ of from 50000 g/mol to 500 000 g/mol, has from 0.01 to 20 $CH_3$/1000 carbon atoms and has at least 0.6 vinyl groups/1000 carbon atoms, and b) 5%-80% (w/w), preferably 10-60% (w/w), preferably 20-45% (w/w) of a polar copolymer of ethylene with at least one comonomer which comonomer is selected from the group consisting of an acrylat and acrylic acid and wherein the composition comprises polymer chains which have been grafted with 0.01% to 10%, preferably with 0.05% to 5%, of ethylenically unsaturated dicarboxylic acids and/or dicarboxylic anhydrides, based on the total weight of the composition.

Examples of suitable $C_3$-$C_{20}$-alkenes according to the present invention are e.g. α-olefins such as propene, 1-butene, 1-pentene, 1-hexene, 4-methyl-1-pentene, 1-heptene or 1-octene. Preferably, the $C_3$-$C_{20}$-alkenes are α-olefins. The ethylene copolymer a) preferably comprises α-alkenes having from 4 to 8 carbon atoms in copolymerized form as comonomer unit. Particular preference is given to using α-alkenes selected from the group consisting of 1-butene, 1-hexene and 1-octene.

The number of side chains formed by incorporation of the comonomer and their distribution, is very different when using the different catalyst systems. The number and distribution of the side chains has a critical influence on the crystallization behavior of the ethylene copolymers. While the flow properties and thus the processability of these ethylene copolymers depends mainly on their molar mass and molar mass distribution, the mechanical properties are therefore particularly dependent on the short chain branching distribution. The crystallization behavior of the ethylene copolymers during cooling of the film extrudate is an important factor in determining how quickly and in what quality a film can be extruded. The correct combination of catalysts for a balanced combination of catalysts for a balanced combination of good mechanical properties and good processability is a crucial factor here. Notably, with regard to vinyl group content of the ensuing copolymer, different metallocene catalysts have drastically different intrinsic potential.

Examples of suitable suitable copolymer b) and acrylates are copolymers of ethylene preferably with $C_1$-$C_{10}$-alkyl-acrylate, preferably is $C_1$-$C_6$-alkyl-acrylates wherein 'acrylate' is an alkylester of acrylic acid and wherein preferably the alkyl is n-alkyl, are ethyl-acrylate, n-butylacrylate, n-butyl-metacrylate. Similar to acrylate as used in the foregoing, the term acrylic acid encompasses metacrylic acid, too.

According to the present invention, a copolymer is to be understood as a co-polymer of ethylene with at least one comonomer, that is, a 'copolymer' according to the present invention also encompasses terpolymer and higher, multiple comonomer co-polymerizates. As opposed to a homopolymer, a co-polymer thus comprises at least >3.5.% (w/w) of a comonomer in addition to ethylene, based on total weight of said copolymer. In a preferred embodiment though, a 'copolymer' is a truly binary co-polymerizate of ethylene and of substantially one species of comonomer only. 'substantially one species' preferably means that >97% (w/w) of comonomer amounts to one comonomer molecule.

Preferably, the polymer component A) has a CDBI of 20-70%, preferably of less than 50%. CDBI (composition distribution breadth index) is a mesure of the breadth of the distribution of the composition. This is described, for example, in WO 93/03093. The CDBI is defined as the percent by weight or mass fraction of the the copolymer molecules having a comonomer contents of ±25% of the mean molar total comonomer content, i.e. the share of comonomer molecules whose comonomer content is within 50% of the average comonomer content. This is determined by TREF (temperature rising elution fraction) analysis (Wild et al. J. Poly. Sci., Poly. Phys. Ed. Vol. 20, (1982), 441 or U.S. Pat. No. 5,008,204). Optionally, it may be determined by more recent CRYSTAF analysis.

Preferably, the molar mass distribution width (MWD) or polydispersity $M_w/M_n$ is from 8 to 20, more preferably it is 9-15. Definition of $M_w$, $M_n$, MWD can be found in the 'Handbook of PE', ed. A. Peacock, p. 7-10, Marcel Dekker Inc., New York/Basel 2000. The determination of the molar mass distributions and the means Mn, Mw and Mw/Mn derived therefrom was carried out by high-temperature gel permeation chromatography using a method described in DIN 55672-1:1995-02 issue February 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB.

A WATERS Alliance 2000 equipped with the following precolumn SHODEX UT-G and separation columns SHODEX UT 806 M (3×) and SHODEX UT 807 connected in series was used. The solvent was vacuum destilled under Nitrogen and was stabilized with 0.025% by weight of 2,6-di-tert-butyl-4-methylphenol. The flowrate used was 1 ml/min, the injection was 500 µl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX,UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., & in J. Polymer Sci., Phys. Ed., 5, 753(1967)). The Mark-Houwing parameters used herefore were for PS: $k_{PS}$=0.000121 dl/g, $α_{PS}$=0.706 and for PE $k_{PE}$=0.000406 dl/g, $α_{PE}$=0.725, valid in TCB at 135° C. Data recording, calibration and calculation was carried out using NTGPC_Control_V6.02.03 and NTG-PC_V6.4.24 (hs GmbH, Hauptstraße 36, D-55437 Ober-Hilbersheim) respectively.

It is well-known in the art that the $q_0$-viscosity (zero-viscosity) of a polymer may be calculated from the weight average weight $M_w$ according to $η_0$=$M_w$ exp(3.4) a wherein a is a constant.

The blend ensuing from mixing of the polar component b) with the polyethylene homo- or copolymeric component a) of the present invention has good mechanical properties, good processability and retains excellent adhesive properties at elevated temperatures of from 70-95° C. Moreover, it comprehensively displays desired cohesive fracture at both low and elevated temperature in peel testing under forced conditions. The adhesive blend of the present invention adheres to a wide range of freshly hardened expoxy resin surfaces that differ in hardness which may be quantitated by shore A hardness. Shore A hardness tests are substantially carried out with an A type Durometer following the procedure of standard ISO 868(2003).

The blend of the present invention shows minimized neck-in during film extrusion onto a rotating, laterally passing surface such as a rotating pipe and has, based on measurement of storage modulus G' with a cone-and-plate rheometer, little residual elasticity. Otherwise, the strain in between the film extrusion die and the rotating steel pipe would result in 'pumping' of the film, promoting neck-in of the film width and ensuing irregular coating thickness or even generation of blank spots on the surface of the rotating steel pipe. Preferably, the blend of the present invention has a storage modulus G' (measured at 0.01 rad/s) of <20 Pa, more preferably of <10 Pa and most preferably of from 2 to 8 Pa. As is commonly known to the skilled person, G' is determined as the ratio of shear to strain upon dynamic (sinusoidal) deformation of the polymer blend in a cone-and-plate rheometer such as e.g. a Rheometrics RDA II Dynamic Rheometer or a plate-and-plate rheometer such as e.g. from Anton Paar. The preferred methodology, employing a plate-and-plate rheometer is described in the experimental section in detail.

The polyethylene component a) of the invention has a molar mass distribution width $M_w/M_n$, also termed MWD or polydispersity, in the range of from 5 to 30, preferably of from 6 to 20 and particularly preferably of from 7 to 15. The density of the polyethylene a) of the invention is preferably in the range of from 0.93 to 0.955 g/cm³, more preferably of from 0.9305 to 0.945 g/cm³ and most preferably in the range from 0.931 to 0.940 g/cm³. The weight average molar mass $M_w$ of the polyethylene a) of the invention is in the range of from 20 000 g/mol to 500 000 g/mol, preferably from 50 000 g/mol to 300 000 g/mol and particularly preferably from 80 000 g/mol to 200 000 g/mol.

Preferably, the z average molar mass $M_z$ of the polyethylene of the invention is in the range of less than 1 Mio. g/mol, preferably of from 200 000 g/mol to 800 000 g/mol. The definition of z-average molar mass $M_z$ is e.g. defined in Peacock, A. (ed.), Handbook of PE, and is published in High Polymers Vol. XX, Raff and Doak, Interscience Publishers, John Wiley & Sons, 1965, S. 443.

Der HLMI of the polyethylene a) of the invention is preferably in the range of from 15 to 150 g/10 min, preferably in the range of from 20 bis 100 g/10 min. For the purposes of this invention as is well known to the skilled person, the expression "HLMI" means "high load melt index" and is determined at 190° C. under a load of 21.6 kg (190° C./21.6 kg) in accordance with ISO 1133. Likewise, the melt index is the melt rheology value determined at the same temperature but under a load of 2.16 kg only. Further with relevance to smooth, convenient extrusion behaviour at mild pressure, preferably the amount of the polyethylene of the invention with a molar mass of <1 Mio. g/mol, as determined by GPC for standard determination of the molecular weight distribution, is preferably above 95.5% by weight, preferably above 96% by weight and particularly preferably above 97% by weight. This is determined in the usual course of the molar mass distribution measurement by applying the WIN-GPC' software of the company 'HS-Entwicklungsgesellschaft für wissenschaftliche Hard-und Software mbH', Ober-Hilbersheim/Germany, for instance.

The polyethylene a) of the invention has preferably at least 0.6 vinyl groups/1000 carbon atoms, e.g. of from 0.6 up to 2 vinyl groups/1000 carbon atoms, preferably of from 0.9 to 10 vinyl groups/1000 carbon atoms and more preferably of from 1 to 5 vinyl groups/1000 carbon atoms and most preferably of from 1.2 to 2 vinyl groups/1000 carbon atoms. The content of vinyl groups/1000 carbon atoms is determined by means of IR, according to ASTM D 6248-98. For the present purposes, the expression vinyl groups refers to —CH=CH₂ groups; vinylidene groups and internal olefinic groups are not encompassed by this expression. Vinyl groups are usually attributed to a polymer termination reaction after an ethylene insertion, while vinylidene end groups are usually formed after a polymer termination reaction after a comonomer insertion. Preference is given to at least 0.9 vinyl groups/1000 carbon atoms, preferably from 1 to 3 vinyl groups/1000 carbon atoms and particularly preferably from 1.3 to 2 vinyl groups/1000 carbon atoms being present in the 20% by weight of the polyethylene having the lowest molar masses. This can be determined by solvent-nonsolvent fractionation, later called Holtrup fractionation as described in W. Holtrup, Makromol. Chem. 178, 2335 (1977) coupled with IR measurement of the different fractions, with the vinyl groups being measured in accordance with ASTM D 6248-98. Xylene and ethylene glycol diethyl ether at 130° C. were used as solvents for the fractionation. 5 g of polymer were used and were divided into 8 fractions.

The polyethylene a) of the invention preferably has at least 0.05 vinylidene groups/1000 carbon atoms, in particular from 0.1 to 1 vinylidene groups/1000 carbon atoms and particularly preferably from 0.14 to 0.4 vinylidene groups/1000 carbon atoms. The determination is carried out by IR measurement in accordance with ASTM D 6248-98.

The polyethylene of the invention has from 0.01 to 20 branches/1000 carbon atoms, preferably from 0.5 to 10 branches/1000 carbon atoms and particularly preferably from 1.5 to 8 branches/1000 carbon atoms. The branches/1000 carbon atoms are determined by means of ¹³C-NMR, as described by James. C. Randall, JMS-REV. Macromol. Chem. Phys., C29 (2&3), 201-317 (1989), and refer to the total content of CH₃ groups/1000 carbon atoms including end groups. The branching contents is to be understood as side chains measured as CH₃/1000 carbon atoms, preferably from 1 to 10 CH₃/1000 carbon atoms. It is particularly preferred in polyethylene copolymerized with 1-butene, 1-hexene or 1-octene as the 1-alkene to have of from 0.01 to 20 ethyl, butyl or hexyl short chain branches/1000 carbon atoms, more preferably from 1 to 10 ethyl, butyl or hexyl branches/1000 carbon atoms and particularly preferably of from 2 to 6 ethyl, butyl or hexyl branches/1000 carbon atoms. It may otherwise be coined 'short chain branching' (SCB) with such side branches being $C_2$-$C_6$ side chains.

Strongly preferred, according to the present invention, is that the polyethylene component A) has a substantially multimodal, preferably bimodal, distribution in TREF analysis, determining the comonomer content based on crystallinity behaviour/melting temperature essentially independent of molecular weight of a given polymer chain. A polymer chain is a single molecule constituted by covalent bonding and obtained from polymerisation of olefines, said polymer chain having a molecular weight of at least 5000. A TREF-multimodal distribution means that TREF analysis resolves at least two or more distinct maxima indicative of at least two differing branching rates and hence conomonomer insertion rates during polymerization reactions. TREF analysis analyzes comonomer distribution based on short side chain branching frequency essentially independent of molecular weight, based on the crystallization behaviour (Wild, L., Temperature rising elution fractionation, Adv. Polymer Sci. 98: 1-47, (1990), also see description in U.S. Pat. No. 5,008,204 incorporated herewith by reference). Optionally to TREF, more recent CRYSTAF technique may be employed to the same end. Typically, in a preferred embodiment of the present invention, component a) comprises at least two, preferably substantially two, different polymeric subfractions synthesized preferably by different single-site catalysts, namely a first preferably non-metallocene-one having a lower comonomer contents, a high vinyl group contents and preferably a broader molecular weight distribution, and a second, preferably metallocene one having a higher comonomer contents, a more narrow molecular weight distribution and, optionally, a lower vinyl group contents. Further preferred, typically, the numeric value for the z-average molecular weight of the first or non-metallocene subfraction will be smaller or ultimately substantially the same as the z-average molecular weight of the second or metallocene subfraction. Preferably, according to TREF analysis, the 40% by weight or mass fraction, more preferably 5-40%, most preferably 20% by weight of the polyethylene component A) having the the higher comonomer content (and lower level of crystallinity) have a degree of branching of from 2 to 40 branches/1000 carbon atoms and/or the the 40% by weight or mass fraction, more preferably 5-40%, most preferably 20% by weight of the polyethylene component A) having the the lower comonomer content (and higher level of crystallinity) have a degree of branching of less than 2, more preferably of from 0.01 to 2 branches/1000 carbon atoms. Likewise it may be said that where the polyethylene component A) displays a multimodal, that is at least bimodal distribution in GPC analysis, preferably the 5-40% by weight of the polyethylene a) of the invention having the highest molar masses, preferably 10-30% by weight and particularly preferably 20% by weight, have a degree of branching of from 1 to 40 branches/1000 carbon atoms, more preferably of from 2 to 20 branches/1000 carbon atoms. It is a characteristic of the product of the metallocene catalyst A) giving rise to this subfraction of the polyethylene of component a). Likewise it may preferably be said that due to the preferably more broadly distributed non-metallocene catalyst subfraction of component A), usually both with bimodal or substantially monomodal GPC distribution curves for component a), the 30%, preferably 15%, more preferably 5% by weight of the polyethylene having the lowest molar masses have a degree of branching of less than 5 branches/1000 carbon atoms, more preferably of less than 2 branches/1000 carbon atoms. Furthermore, it is preferred that at least 70% of the branches of side chains larger than $CH_3$ in the polyethylene of the invention are present in the 50% by weight of the polyethylene having the highest molar masses. The part of the polyethylene having the lowest or highest molar mass is determined by the method of solvent-nonsolvent fractionation, later called Holtrup fractionation as described and referenced in the forgoing already. Afore said 8 fractions are subsequently examined by $^{13}C$-NMR spectroscopy. The degree of branching in the various polymer fractions can be determined by means of $^{13}C$-NMR as described by James. C. Randall, JMS-REV. Macromol. Chem. Phys., C29 (2&3), 201-317 (1989). The degree of branching simply is the total $CH_3$ group content/1000 carbon atoms, preferably in the high molecular weight fractions, and reflects the comonomer incorporation rate.

Preferably, the η(vis) value of the component a) is 0.3 to 7 dl/g, more preferably of from 1 to 1.5 dl/g or optionally more preferably of from 1.3 to 2.5 dl/g. η (vis) is the intrinsic viscosity as determined according to ISO 1628-1 and -3 in Decalin at 135° C. by capillary viscosity measurement.

The polyethylene component a) of the present invention may be a monomodal or multimodal, that is at least biomodal, polyethylene homo- or copolymer in high temperature gel permeation chromatography analysis (high temperature GPC for polymers according to the method described in DIN 55672-1:1995-02 issue February 1995 with specific deviations made as said above, in the section on determining Mw,Mn by means of HT-GPC). The molecular weight distribution curve of a GPC-multimodal polymer can be looked at as the superposition of the molecular weight distribution curves of the polymer subfractions or subtypes which will accordingly show two or more distinct maxima or will at least be distinctly broadened compared with the curves for the individual fractions. A polymer showing such a molecular weight distribution curve is called 'bimodal' or 'multimodal' with regard to GPC analysis, respectively. Such GPC-multimodal polymers, or multimodal polymers for short, can be produced according to several processes, e.g. in a multi-stage process in a multi-step reaction sequence such as described in WO 92/12182.

In one preferred embodiment, preferably employing a mixed system of at least two single-site catalysts according to the present invention, the component a) polyethylene is a GPC-multimodal polymer, more preferably a polymer bimodal in GPC analysis or, even more preferred, the polyethylene component a) has a substantially monomodal molecular mass distribution curve as determined by GPC, hence is monomodal in GPC, whilst it truly is a pseudo-monomodal product blended from or, particularly preferred according to the present invention, whilst it truly is a pseudo-monomodal in situ reaction product amounting to a mix of different catalyst's product grades systems, preferably single site catalysts, whose individual molecular weight distributions overlap and do not resolve as to display two distinct maxima any more. Most preferably, such (pseudo-)monomodal reaction product being component A) of the ahesive composition of the present invention is obtained in situ in a one-pot reaction with a mixed or hybrid catalyst system, preferably with mixed single-site catalysts, giving rise to a particularly homogenous, in-situ mixture of different catalyst's products which homogeneity is not obtainable by conventional blending techniques.

The polyethylene of the invention preferably has a mixing quality measured in accordance with ISO 13949 of less than 3, in particular from 0 to 2.5. This value is based on the polyethylene taken directly from the reactor, i.e. the polyethylene powder without prior melting in an extruder. This polyethylene powder is preferably obtainable by polymerization in a single reactor. The mixing quality of a polyethylene powder obtained directly from the reactor can be tested by assessing thin slices ("microtome sections") of a sample under an optical microscope. Inhomogenities show up in the form of specks or "white spots". The specs or "white spots" are predominantly high molecular weight, high-viscosity particles in a low-viscosity matrix (cf., for example, U. Burkhardt et al. in "Aufbereiten von Polymeren mit neuartigen Eigenschaften", VDI-Verlag, Düsseldorf 1995, p. 71). Such inclusions can reach a size of up to 300 μm, cause stress cracks and result in brittle failure of components. The better the mixing quality of a polymer, the fewer and smaller are these inclusions observed. The mixing quality of a polymer is determined quantitatively in accordance with ISO 13949. According to the measurement method, a microtome section is prepared from a sample of the polymer, the number and size of these inclusions are counted and a grade is determined for the mixing quality of the polymer according to a set assessment scheme.

The polyethylene of the invention preferably has a degree of long chain branching λ (lambda) of from 0 to 2 long chain branches/10 000 carbon atoms and particularly preferably from 0.1 to 1.5 long chain branches/10 000 carbon atoms. The degree of long chain branching λ (lambda) was measured by light scattering as described, for example, in ACS Series 521, 1993, Chromatography of Polymers, Ed. Theodore Provder; Simon Pang and Alfred Rudin: Size-Exclusion Chromatographic Assessment of Long-Chain Branch Frequency in Polyethylenes, page 254-269.

The preferred embodiments that have been described in the foregoing with regard to the polyethylene component a) apply likewise to the optionally polyethylene component c), which is mandatory if no share of component a) has been grafted with ethylenically unsaturated dicarboxylic acid or acid anhydride according to the present invention.

The grafting process itself is well known in the art, grafting may be applied to individual components a) or a) and b) or c) or c) and b), as the case may be, before blending of the components or suitably, in one preferred embodiment, directly in a one-pot reaction with the blending e.g. in an heated extruder. The reaction process of grafting is well known in the art. In a preferred embodiment, no radical starter compound such as e.g. a peroxide is employed for initiating the grafting polymerization reaction with the ethylenically unsaturated dicarboxylic acid or acid anhydride.

The polyethylene of the invention can further comprise of from 0 to 6% by weight, preferably 0.1 to 1% by weight of auxiliaries and/or additives known per se, e.g. processing stabilizers, stabilizers against the effects of light and heat an/or oxidants. A person skilled in the art will be familiar with the type and amount of these additives. Notably, as a further advantage of the invention, in a further preferred embodiment the extrusion films made from the adhesive composition of the present invention do not further require the addition of lubricants, antistatics and/or antiblocking agents, meaning that the films manufactured from the adhesive polymer composition of the present invention are substantially free from lubricants, antistatics and/or antiblocking agents.

In general mixing of the additives and the polyethylene of the invention can be carried out by all known methods, though preferably directly by means of an extruder such as a twin-screw extruder. Films produced by film extrusion from the adhesive composition of the present invention are a further object of the present invention. The extruder technique is described e.g. in U.S. Pat. No. 3,862,265, U.S. Pat. No. 3,953,655 and U.S. Pat. No. 4,001,172, incorporated herewith by reference. The film extrusion process is preferably operated, according to the present invention, at a pressure of 100 to 500 bar and preferably a temperature of from 200 to 300° C.

The polyethylene component a) of the invention is obtainable using the catalyst system described below and in particular its preferred embodiments. Preferably, a single site catalyst or catalyst system is employed for providing said polyethylene a) according to the present invention. More preferably, the present invention further employs a catalyst composition comprising at least two different single-site polymerization catalysts of which A) is at least one metallocene polymerization catalyst preferably based on a hafnocene (A) and of which B) is at least one polymerization catalyst based on a transition metal complex, preferably is an iron complex component which iron complex more preferably has a tridentate ligand (B). Either catalyst (A) or (B) or both, preferably the transition metal complex single-site catalyst (B), is conferring the high vinyl group contents characteristic for the present invention to the polyethylene component a) and accordingly preferably is a catalyst capable of producing an ethylene homo- or copolymer having a vinyl group content of at least 0.6 vinyl groups/1000 carbon atoms, more preferably of at least 0.9 vinyl groups/1000 carbon atoms and most preferably of at least 1.2 vinyl groups/1000 carbon atoms.

Hafnocene catalyst components are, for example, cyclopentadienyl complexes. The cyclopentadienyl complexes can be, for example, bridged or unbridged biscyclopentadienyl complexes as described, for example, in EP 129 368, EP 561 479, EP 545 304 and EP 576 970, monocyclopentadienyl complexes such as bridged amidocyclopentadienyl complexes described, for example, in EP 416 815, multinuclear cyclopentadienyl complexes as described in EP 632 063, pi-ligand-substituted tetrahydropentalenes as described in EP 659 758 or pi-ligand-substituted tetrahydroindenes as described in EP 661 300.

Particularly suitable hafnocenes (A) are hafnium complexes of the general formula (I)

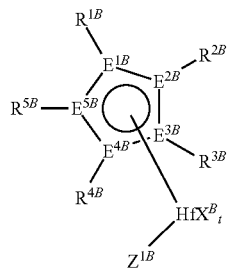

(I)

where the substituents and indices have the following meanings:

$X^B$ is fluorine, chlorine, bromine, iodine, hydrogen, $C_1$-$C_{10}$-alkyl, $C_2$-$C_{10}$-alkenyl, $C_6$-$C_{15}$-aryl, alkylaryl having from 1 to 10 carbon atoms in the alkyl part and from 6 to 20 carbon atoms in the aryl part, —$OR^{6B}$ or —$NR^{6B}R^{7B}$, or two radicals $X^B$ form a substituted or unsubstituted diene ligand, in particular a 1,3-diene ligand, and the radicals $X^B$ are identical or different and may be joined to one another, $E^{1B}$-$E^{5B}$ are each carbon or not more than one $E^{1B}$ to $E^{5B}$ is phosphorus or nitrogen, preferably carbon, t is 1, 2 or 3 and is, depending on the valence of Hf, such that the metallocene complex of the general formula (VI) is uncharged, where $R^{6B}$ and $R^{7B}$ are each $C_1$-$C_{10}$-alkyl, $C_6$-$C_{15}$-aryl, alkylaryl, arylalkyl, fluoroalkyl or fluoroaryl each having from 1 to 10 carbon atoms in the alkyl part and from 6 to 20 carbon atoms in the aryl part and $R^{1B}$ to $R^{5B}$ are each, independently of one another hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and from 6 to 21 carbon atoms in the aryl part, $NR^{8B}{}_2$, $N(SiR^{8B}{}_3)_2$, $OR^{8B}$, $OSiR^{8B}{}_3$, $SiR^{8B}{}_3$, where the organic radicals $R^{1B}$-$R^{5B}$ may also be substituted by halogens and/or two radicals $R^{1B}$-$R^{5B}$, in particular vicinal radicals, may also be joined to form a five-, six- or seven-membered ring, and/or two vicinal radicals $R^{1D}$-$R^{5D}$ may be joined to form a five-, six- or seven-membered heterocycle containing at least one atom from the group consisting of N, P, O and S, where the radicals $R^{8B}$ can be identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy and $Z^{1B}$ is $X^B$ or where the radicals

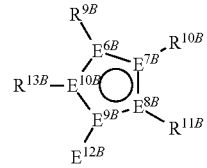

$R^{9B}$ to $R^{13B}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and 6-21 carbon atoms in the aryl part, $NR^{14B}{}_2$, $N(SiR^{14}B_3)_2$, $OR^{14B}$, $OSiR^{14B}{}_3$, $SiR^{14B}{}_3$, where the organic radicals $R^{9B}$-$R^{13B}$ may also be substituted by halogens and/or two radicals $R^{9B}$-$R^{13B}$, in particular vicinal radicals, may also be joined to form a five-, six- or seven-membered ring, and/or two vicinal radicals $R^{9B}$-$R^{13B}$ may be joined to form a five-, six- or seven-membered heterocycle containing at least one atom from the group consisting of N, P, O and S, where the radicals $R^{14B}$ are identical or different and are each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, $E^{6B}$-$E^{10B}$ are each carbon or not more than one $E^{6B}$ to $E^{10B}$ is phosphorus or nitrogen, preferably carbon, or where the radicals $R^{4B}$ and $Z^{1B}$ together form an —$R^{15B}{}_v$-$A^{1B}$- group, where $R^{15B}$ is

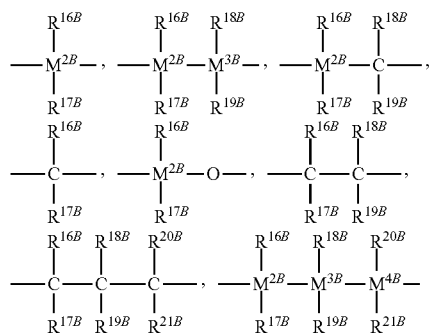

$=BR^{16B}, =BNR^{16B}R^{17B}, =AlR^{16B}, -Ge-, -Sn-,$
$-O-, -S-, =SO, =SO_2, =NR^{16B}, =CO, =PR^{16B}$ or
$=P(O)R^{16B},$
where
$R^{16B}$-$R^{21B}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and
$M^{2B}$-$M^{4B}$ are each silicon, germanium or tin, or preferably silicon,
$A^{1B}$ is $-O-, -S-,$

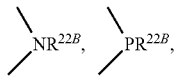

$=O, =S, =NR^{22B}, -O-R^{22B}, -NR^{22B}_2, -PR^{22B}_2$ or an unsubstituted, substituted or fused, heterocyclic ring system,
where
the radicals $R^{22B}$ are each, independently of one another, $C_1$-$C_{10}$-alkyl, $C_6$-$C_{15}$-aryl, $C_3$-$C_{10}$-cycloalkyl, $C_7$-$C_{18}$-alkylaryl or $Si(R^{23B})_3$,
$R^{23B}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl,
v is 1 or when $A^{1B}$ is an unsubstituted, substituted or fused, heterocyclic ring system may also be 0
or where the radicals $R^{4B}$ and $R^{12B}$ together form an $-R^{15B}-$ group.

$A^{1B}$ can, for example together with the bridge $R^{15B}$, form an amine, ether, thioether or phosphine. However, $A^{1B}$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups which can contain from one to four nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups which may contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, 3$^{rd}$ revised edition, Verlag Chemie, Weinheim 1957.

The radicals $X^B$ in the general formula (I) are preferably identical, preferably fluorine, chlorine, bromine, $C_1$-$C_7$-alkyl or aralkyl, in particular chlorine, methyl or benzyl.

The synthesis of such complexes can be carried out by methods known per se, with the reaction of the appropriately substituted cyclic hydrocarbon anions with halides of hafnium being preferred. Examples of appropriate preparative methods are described, for example, in Journal of Organometallic Chemistry, 369 (1989), 359-370.

The hafnocenes can be used in the Rac or pseudo-Rac form. The term pseudo-Rac refers to complexes in which the two cyclopentadienyl ligands are in the Rac arrangement relative to one another when all other substituents of the complex are disregarded.

Examples of suitable hafnocenes (A) are, inter alia, methylenebis(cyclopentadienyl)hafnium dichloride, methylenebis(3-methylcyclopentadienyl)hafnium dichloride, methylenebis(3-n-butylcyclopentadienyl)hafnium dichloride, methylene-bis(indenyl)hafnium dichloride, methylenebis(tetrahydroindenyl) hafnium dichloride, isopropylidenebis(cyclopentadienyl)hafnium dichloride, isopropylidenebis(3-trimethylsilylcyclopentadienyl)hafnium dichloride, isopropylidenebis(3-methylcyclopentadienyl)hafnium dichloride, isopropylidenebis(3-n-butylcyclopentadienyl) hafnium dichloride, isopropylidenebis(3-phenylcyclopentadienyl)hafnium dichloride, isopropylidenebis(indenyl) hafnium dichloride, isopropylidenebis(tetrahydroindenyl) hafnium dichloride, dimethylsilanediylbis (cyclopentadienyl)hafnium dichloride, dimethylsilanediylbis(indenyl)hafnium dichloride, dimethylsilanediylbis(tetrahydroindenyl)hafnium dichloride, ethylenebis(cyclopentadienyl)hafnium dichloride, ethylenebis(indenyl)hafnium dichloride, ethylenebis(tetrahydroindenyl) hafnium dichloride, tetramethylethylene-9-fluorenyl-cyclopentadienylhafnium dichloride, dimethylsilanediylbis (tetramethylcyclopentadienyl)hafnium dichloride, dimethylsilanediylbis(3-trimethylsilylcyclopentadienyl) hafnium dichloride, dimethylsilanediylbis(3-methylcyclopentadienyl)hafnium dichloride, dimethylsilanediylbis(3-n-butylcyclopentadienyl)hafnium dichloride, dimethylsilanediylbis(3-tert-butyl-5-methylcyclopentadienyl)hafnium dichloride, dimethylsilanediylbis(3-tert-butyl-5-ethylcyclopentadienyl)hafnium dichloride, dimethylsilanediylbis(2-methylindenyl)hafnium dichloride, dimethylsilanediylbis(2-isopropylindenyl)hafnium dichloride, dimethylsilanediylbis(2-tert-butylindenyl)hafnium dichloride, diethylsilanediylbis(2-methylindenyl)hafnium dibromide, dimethylsilanediylbis(3-methyl-5-methylcyclopentadienyl)hafnium dichloride, dimethylsilanediylbis(3-ethyl-5-isopropylcyclopentadienyl)hafnium dichloride, dimethylsilanediylbis(2-ethylindenyl)hafnium dichloride, dimethylsilanediylbis(2-methyl-4,5-benzindenyl)hafnium dichloride, dimethylsilanediylbis(2-ethyl-4,5-benzindenyl) hafnium dichloride, methylphenylsilanediylbis(2-ethyl-4,5-benzindenyl)hafnium dichloride, diphenylsilanediylbis(2-methyl-4,5-benzindenyl)hafnium dichloride, diphenylsilanediylbis(2-ethyl-4,5-benzindenyl)hafnium dichloride, diphenylsilanediylbis(2-methylindenyl)hafnium dichloride, dimethylsilanediylbis(2-methyl-4-phenylindenyl)hafnium dichloride, dimethylsilanediylbis(2-ethyl-4-phenylindenyl)hafnium dichloride, dimethylsilanediylbis(2-methyl-4-(1-naphthypindenyl)hafnium dichloride, dimethylsilanediylbis(2-ethyl-4-(1-naphthypindenyl) hafnium dichloride, dimethylsilanediylbis(2-propyl-4-(9-phenanthrypindenyl)hafnium dichloride, dimethylsilanediylbis(2-methyl-4-isopropylindenyl)hafnium dichloride, dimethylsilanediylbis(2,7-dimethyl-4-isopropylindenyl)hafnium dichloride, dimethylsilanediylbis(2-methyl-4,6-diisopropylindenyl)hafnium dichloride, dimethylsilanediylbis(2-methyl-4[p-trifluoromethylphenyl]indenyl) hafnium dichloride, dimethylsilanediylbis(2-methyl-4-[3',5'-dimethylphenyl]indenyl)hafnium dichloride, dimethylsilanediylbis(2-methyl-4-[4'-tert-butylphenyl]indenyl)hafnium dichloride, diethylsilanediylbis(2-methyl-4-[4'-tert-butylphenyl]indenyl)hafnium dichloride, dimethylsilanediylbis(2-ethyl-4-[4'-tert-butylphenyl]-indenyl)hafnium dichloride, dimethylsilanediylbis(2-propyl-4-[4'-tert-butylphenyl]indenyl)hafnium dichloride, dimethylsilanediylbis(2-isopropyl-4-[4'-tert-butylphenyl]indenyl)hafnium dichloride, dimethylsilanediylbis(2-n-butyl-4-[4'-tert-butylphenyl] indenyl)hafnium dichloride, dimethylsilanediylbis(2-hexyl-4-[4'-tert-butylphenyl]indenyl)hafnium dichloride, dimethylsilanediyl(2-isopropyl-4-(1-naphthyl)indenyl)(2-methyl-4-(1-naphthyl)indenyl)hafnium dichloride, dimethylsilanediyl(2-isopropyl-4-[4'-tert-butylphenyl]indenyl)(2-methyl-4-[1'-naphthyl]indenyl)hafnium dichloride and ethylene(2-isopropyl-4-[4'-tert-butylphenyl]indenyl)(2-methyl-4-[4'-tert-butylphenyl]indenyl)hafnium dichloride, and also the corresponding dimethylhafnium, monochloromono(alkylaryloxy)hafnium and di(alkylaryloxy)hafnium compounds. The complexes can be used in the rac form, the meso form or as mixtures of these.

Among the hafnocenes of the general formula (I), those of the formula (II)

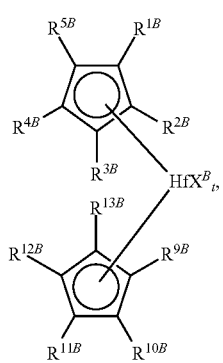

(II)

are preferred.

Among the compounds of the formula (VII), preference is given to those in which
$X^B$ is fluorine, chlorine, bromine, $C_1$-$C_4$-alkyl or benzyl, or two radicals $X^B$ form a substituted or unsubstituted butadiene ligand,
t is 1 or 2, preferably 2,
$R^{1B}$ to $R^{5B}$ are each hydrogen, $C_1$-$C_8$-alkyl, $C_6$-$C_8$-aryl, $NR^{8B}_2$, $OSiR^{8B}_3$ or $Si(R^{8B})_3$ and
$R^{9B}$ to $R^{13B}$ are each hydrogen, $C_1$-$C_8$-alkyl or $C_6$-$C_8$-aryl, $NR^{14B}_2$, $OSiR^{14B}_3$ or $Si(R^{14B})_3$
or in each case two radicals $R^{1B}$ to $R^{5B}$ and/or $R^{9B}$ to $R^{13B}$ together with the $C_5$ ring form an indenyl, fluorenyl or substituted indenyl or fluorenyl system.

The hafnocenes of the formula (II) in which the cyclopentadienyl radicals are identical are particularly useful.

Examples of particularly suitable compounds (A) of the formula (II) are, inter alia: bis(cyclopentadienyl)hafnium dichloride, bis(indenyl)hafnium dichloride, bis(fluorenyl) hafnium dichloride, bis(tetrahydroindenyl)hafnium dichloride, bis(pentamethylcyclopentadienyl)hafnium dichloride, bis(trimethylsilylcyclopentadienyl)hafnium dichloride, bis(trimethoxysilylcyclopentadienyl)hafnium dichloride, bis(ethylcyclopentadienyl)hafnium dichloride, bis(isobutylcyclopentadienyl)hafnium dichloride, bis(3-butenylcyclopentadienyl)hafnium dichloride, bis(methylcyclopentadienyl)hafnium dichloride, bis(1,3-di-tert-butylcyclopentadienyl)hafnium dichloride, bis(trifluoromethylcyclopentadienyl)hafnium dichloride, bis(tert-butylcyclopentadienyl)hafnium dichloride, bis(n-butylcyclopentadienyl)hafnium dichloride, bis(phenylcyclopentadienyl)hafnium dichloride, bis(N,N-dimethylaminomethylcyclopentadienyl)hafnium dichloride, bis(1,3-dimethylcyclopentadienyl)hafnium dichloride, bis (1-n-butyl-3-methylcyclopentadienyl)hafnium dichloride, (cyclopentadienyl)(methylcyclopentadienyl)hafnium dichloride, (cyclopentadienyl)(n-butylcyclopentadienyl) hafnium dichloride, (methylcyclopentadienyl)(n-butylcyclopentadienyl)hafnium dichloride, (cyclopentadienyl)(1-methyl-3-n-butylcyclopentadienyl)hafnium dichloride, bis (tetramethylcyclopentadienyl)hafnium dichloride and also the corresponding dimethylhafnium compounds.

Further examples are the corresponding hafnocene compounds in which one or two of the chloride ligands have been replaced by bromide or iodide.

Suitable catalysts B) preferably are iron catalyst complexes of the general formulae (IIIa), preferably suitable for and capable of providing for a polyethylen product having a vinyl group content of at least 0.6 vinyl groups, in particular more than 0.9 vinyl groups/1000 C atoms, structure (IIIa) being

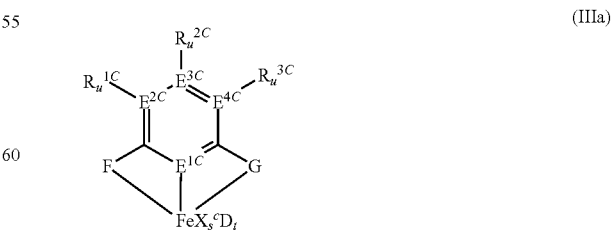

(IIIa)

wherein the variables have the following meaning:
F and G, independently of one another, are selected from the group consisting of:

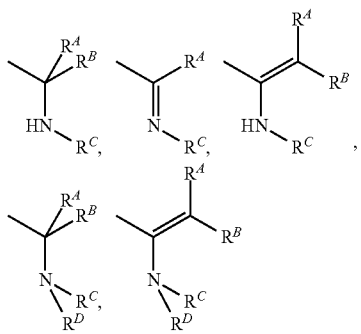

And further wherein preferably at least one of F and G is an enamine or imino radical as selectable from above said group, with the proviso that where F is imino, then G is imino with G, F each bearing at least one aryl radical with each bearing a halogen or a tert. alkyl substituent in the ortho-position, together giving rise to the tridentate ligand of formula IIIa, or then G is enamine, more preferably that at least F or G or both are an enamine radical as selectable from above said group or that both F and G are imino, with G, F each bearing at least one, preferably precisely one, aryl radical with each said aryl radical bearing at least one halogen or at least one tert. alkyl substituent, preferably precisely one halogen, or one tert.alkyl, in the ortho-position, $R^{1C}$-$R^{3C}$ are each, independently of one another, hydrogen $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are joined to form a five-, six- or seven-membered heterocycle containing at least one atom from the group consisting of N, P, O and S, $R^A$,$R^B$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{19C}_3$, wherein the organic radicals $R^A$,$R^B$ can also be substituted by halogens, and/or in each case two radicals $R^A$,$R^B$ can also be bonded with one another to form a five- or six-membered ring, $R^C$,$R^D$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{19C}_3$, wherein the organic radicals $R^C$,$R^D$ can also be substituted by halogens, and/or in each case two radicals $R^C$,$R^D$ can also be bonded with one another to form a five- or six-membered ring, $E^{1C}$ is nitrogen or phosphorus, in particular nitrogen, $E^{2C}$-$E^{4C}$ are each, independently of one another, carbon, nitrogen or phosphorus, more preferably that 0, 1 or 2 atoms selected from the group consisting of $E^{2C}$-$E^{4C}$ are nitrogen with the proviso that the remainder are carbon, most preferably that $E^{2C}$-$E^{4C}$ are carbon, u is 0 when $E^{2C}$-$E^{4C}$ is nitrogen or phosphorus and is 1 when $E^{2C}$-$E^{4C}$ is carbon, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^{18C}_2$, $OR_{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{19C}_3$, where the organic radicals $R^{18C}$ may also be substituted by halogens or nitrogen- and oxygen-containing groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring, s is 1, 2, 3 or 4, in particular 2 or 3, D is an uncharged donor and t is from 0 to 4, in particular 0, 1 or 2.

The three atoms $E^{2C}$ to $E^{4C}$ in a molecule can be identical or different. If $E^{1C}$ is phosphorus, then $E^{2C}$ to $E^{4C}$ are preferably each carbon. If $E^{1C}$ is nitrogen, then $E^{2C}$ to $E^{4C}$ are each preferably nitrogen or carbon, in particular carbon.

The substituents $R^{1C}$-$R^{3C}$ can be varied within a wide range. Possible carboorganic substituents $R^{1C}$-$R^{3C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^{1C}$ to $R^{3C}$ may also be joined to form a 5-, 6- or 7-membered ring and/or two of the, suitably vicinal, radicals $R^{1C}$-$R^{3C}$ may be joined to form a five-, six- or seven-membered heterocycle containing at least one atom from the group consisting of N, P, O and S and/or the organic radicals $R^{1C}$-$R^{3C}$ may also be substituted by halogens such as fluorine, chlorine or bromine. Furthermore, $R^{1C}$-$R^{3C}$ can also be amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy or halogen such as fluorine, chlorine or bromine. Possible radicals $R^{19C}$ in organosilicon substituents $SiR^{19C}_3$ are the same carboorganic radicals as have been described above for $R^{1C}$-$R^{3C}$, where two $R^{19C}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals may also be bound to $E^{2C}$-$E^{4C}$ via an oxygen or nitrogen, for example trimethylsilyloxy, triethylsilyloxy, butyldimethylsilyloxy, tributylsilyloxy or tri-tert-butyl-silyloxy.

Preferred radicals $R^{1C}$-$R^{3C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

The ligands $X^C$ result, for example, from the choice of the appropriate starting metal compounds used for the synthesis of the iron complexes, but can also be varied afterward. Possible ligands $X^C$ are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands $X^C$. As further ligands $X^C$, mention may be made, purely by way of example and in no way exhaustively, of trifluoroacetate, $BF_4^-$, $PF_6^-$ and weakly coordinating or noncoordinating anions (cf., for example, S. Strauss in Chem. Rev. 1993, 93, 927-942), e.g. $B(C_6F_5)_4^-$. Amides, alkoxides, sulfonates, carboxylates and β-diketonates are also particularly useful ligands $X^C$. Some of these substituted ligands X are particularly preferably used since they are obtainable from cheap and readily available starting materials. Thus, a particularly preferred embodiment is that in which $X^C$ is dimethylamide, methoxide, ethoxide, isopropoxide, phenoxide, naphthoxide, triflate, p-toluenesulfonate, acetate or acetylacetonate.

The number s of the ligands $X^C$ depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

D is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes.

The number t of the ligands D can be from 0 to 4 and is often dependent on the solvent in which the iron complex is prepared and the time for which the resulting complexes are dried and can therefore also be a nonintegral number such as 0.5 or 1.5. In particular, t is 0, 1 or 2.

Variation of the radicals $R^{18C}$ enables, for example, physical properties such as solubility to be finely adjusted. Possible carboorganic substituents $R^{18C}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3 4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where two radicals $R^{18C}$ may also be joined to form a 5- or 6-membered ring and the organic radicals $R^{18C}$ may also be substituted by halogens such as fluorine, chlorine or bromine. Possible radicals $R^{19C}$ in organosilicon substituents $SiR^{19C}_3$ are the same radicals which have been described above for $R^{18C}$, where two radicals $R^{19C}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl allyl, benzyl and phenyl as radicals $R^{18C}$.

In a preferred embodiment the complexes (B) are of formula (IV)

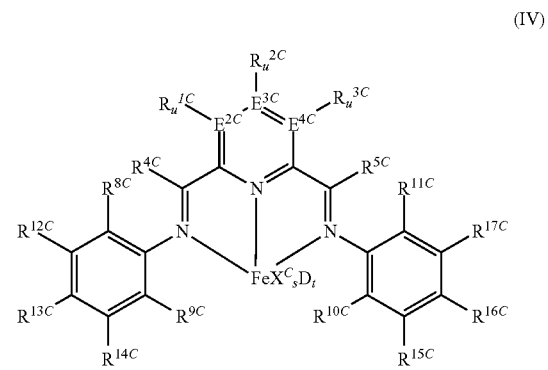

(IV)

where
$E^{2C}$-$E^{4C}$ are each, independently of one another, carbon, nitrogen or phosphorus, more preferably that 0, 1 or 2 atoms selected from the group consisting of $E^{2C}$-$E^{4C}$ are nitrogen with the proviso that the remainder of the group are carbon, most preferably that all $E^{2C}$-$E^{4C}$ are carbon,
$R^{1C}$-$R^{3C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 atoms in the aryl part, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are bound to form a five-, six- or seven-membered heterocycle containing at least one atom from the group consisting of N, P, O and S,
$R^{4C}$-$R^{5C}$ are each, independently of one another, hydrogen, $C_1$-$C_{22}$-alkyl, $C_2$-$C_{22}$-alkenyl, $C_6$-$C_{22}$-alkyl, alkylaryl having from 1 to 10 carbon atoms in the alkyl part and 6-20 carbon atoms in the aryl part, $NR^{18C}_2$, $SiR^{19C}_3$, where the organic radicals $R^{4C}$-$R^{5c}$ may also be substituted by halogens,
u is 0 when $E^{2C}$-$E^{4C}$ is nitrogen or phosphorus and is 1 when $E^{2C}$-$E^{4C}$ is carbon,
$R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{8C}$-$R^{11C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, and with the proviso that at least $R^{8C}$ and $R^{10C}$ are halogen or a tert. $C_1$-$C_{22}$-alkyl group,
$R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O or S, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{19C}_3$, where the organic radicals $R^{18C}$ may also be substituted by halogens and nitrogen- and oxygen-containing groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring, s is 1, 2, 3 or 4, in particular 2 or 3, D is an uncharged donor and t is from 0 to 4, in particular 0, 1 or 2.

The embodiments and preferred embodiments described above with respect to $E^{2C}$-$E^{4C}$, $R^{1C}$-$R^{3C}$, $X^C$, D, s,t, $R^{18C}$ and $R^{19C}$ likewise apply here.

The substituents $R^{4C}$-$R^{5C}$ can be varied within a wide range. Possible carboorganic substituents $R^{4C}$-$R^{5C}$ are, for example, the following: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where the organic radicals $R^{4C}$-$R^{5C}$ may also be substituted by halogens such as fluorine, chlorine or bromine. Furthermore, $R^{4C}$-$R^{5C}$ can be amino $NR^{18C}_2$ or $N(SiR^{19C}_3)_2$, for example dimethylamino, N-pyrrolidinyl or picolinyl. Possible radicals $R^{19C}$ in organosilicon substituents $SiR^{19C}_3$ are the same carboorganic radicals as described above for $R^{1C}$-$R^{3C}$, where two radicals $R^{19C}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{19C}_3$ radicals can also be bound via nitrogen to the carbon bearing them.

Preferred radicals $R^{4C}$-$R^{5C}$ are hydrogen, methyl, ethyl, n-propyl, isopropyl, n-butyl, isobutyl, tert-butyl, n-pentyl, n-hexyl, n-heptyl, n-octyl or benzyl, in particular methyl.

The substituents $R^{8C}$-$R^{17C}$ can be varied within a wide range. Possible carboorganic substituents $R^{8C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3, 4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^{8C}$ to $R^{17C}$ may also be joined to form a 5-, 6- or 7-membered ring and/or two of the vicinal radicals $R^{8C}$-$R^{17C}$ may be joined to form a five-, six- or seven-membered heterocycle containing at least one atom from the group consisting of N, P, O and S and/or the organic radicals $R^{8C}$-$R^{17C}$ may also be substituted by halogens such as fluorine, chlorine or bromine. Furthermore, $R^{8C}$-$R^{17C}$ can be halogen such as fluorine, chlorine, bromine, amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy. Possible radicals $R^{19C}$ in organosilicon substituents $SiR^{19C}_3$ are the same carboorganic radicals which have been mentioned above for $R^{1C}$-$R^{3C}$, where two radicals $R^{19C}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{19C}_3$ radicals can also be bound via an oxygen or nitrogen, for example trimethylsilyloxy, triethylsilyloxy, butyldimethylsilyloxy, tributylsilyloxy or tritert-butylsilyloxy.

Preferred radicals $R^{12C}$-$R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular preferred is, that $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, $R^{15C}$ and $R^{17C}$ are each hydrogen.

Preferred radicals $R^{9C}$ and $R^{11C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^{8C}$ and $R^{10}$ are preferably a halogen such as fluorine, chlorine or bromine, particularly chlorine, and $R^{9C}$ and $R^{11C}$ are each hydrogen or more preferably are each a $C_1$-$C_{22}$-alkyl which may also be substituted by halogens, in particular a $C_1$-$C_{22}$-n-alkyl which may also be substituted by halogens, or a halogen such as fluorine, chlorine or bromine. In another preferred combination $R^{8C}$ and $R^{16C}$ are a tertiary $C_1$-$C_{22}$- alkyl radical, particularly tert. Butyl, and $R^{9C}$ and $R^{11C}$ are each hydrogen or a halogen such as fluorine, chlorine or bromine.

In particularly preferred embodiment, $R^{12C}$, $R^{14C}$, $R^{15C}$ and $R^{17C}$ are identical, $R^{13C}$ and $R^{16C}$ are identical, $R^{9C}$ and $R^{11C}$ are identical and $R^{8C}$ and $R^{10C}$ are identical. This is also preferred in the preferred embodiments described above.

The preparation of the compounds B) is described, for example, in J. Am. Chem. Soc. 120, p. 4049 ff. (1998), J. Chem. Soc., Chem. Commun. 1998, 849, and WO 98/27124. Preferred complexes B) are 2,6-Bis[1-(2-tert.butylphenylimino)ethyl]pyridine iron(II) dichloride, 2,6-Bis[1-(2-tert.butyl-6-chlorophenylimino)ethyl]pyridine iron(II) dichloride, 2,6-Bis[1-(2-chloro-6-methylphenylimino)ethyl]pyridine iron(II) dichloride, 2,6-Bis[1-(2,4-dichlorophenylimino)ethyl]pyridine iron(II) dichloride, 2,6-Bis[1-(2,6-dichlorophenylimino)ethyl]pyridine iron(II) dichloride, 2,6-Bis[1-(2,4-dichlorophenylimino)methyl]pyridine iron(II) dichloride, 2,6-Bis[1-(2,4-dichloro-6-methylphenylimino)ethyl]pyridine iron(II) dichloride2,6-Bis[1-(2,4-difluorophenylimino)ethyl]pyridine iron(II) dichloride, 2,6-Bis[1-(2,4-dibromophenylimino)ethyl]pyridine iron(II) dichloride or the respective trichlorides, dibromides or tribromides.

In the following, as a more preferred embodiment, reference to a transition metal complex (A) or catalyst (A) means a hafnocene (A). The molar ratio of transition metal complex A) to polymerization catalyst B) is usually in the range from 1:100 to 100:1, preferably from 1:10 to 10:1 and particularly preferably from 1:1 to 5:1. When a transition metal complex A) is used as sole catalyst under the same reaction conditions in the homopolymerization or copolymerization of ethylene, it preferably produces a higher Mw than does the complex (B) when it is used as sole complex under the same reaction conditions. The preferred embodiments of the complexes (A) and (B) are likewise preferred in combinations of the two complexes.

When a transition metal complex A) is used as sole catalyst under the same reaction conditions in the homopolymerization or copolymerization of ethylene, it preferably produces a higher Mw than does the complex (B) when it is used as sole complex under the same reaction conditions.

The catalyst composition of the invention can be used alone or together with further components as catalyst system for olefin polymerization. Furthermore, we have found catalyst systems for olefin polymerization comprising A) at least one polymerization catalyst based on a hafnocene (A),
B) at least one polymerization catalyst based on an iron component, preferably having a tridentate ligand as defined above,
C) optionally one or more activating compounds,
D) optionally one or more organic or inorganic supports,
E) optionally one or more metal compounds of a metal of group 1, 2 or 13 of the Periodic Table.

The hafnocene (A) and/or the iron complex (B) sometimes have only a low polymerization activity and are then brought into contact with one or more activators, viz. the component (C), in order to be able to display a good polymerization activity. The catalyst system therefore optionally further comprises, as component (C) one or more activating compounds, preferably one or two activating compounds (C). The catalyst system of the invention preferably comprises one or more activators (C). Depending on the catalyst combinations (A) and (B), one or more activating compounds (C) are advantageous. The activation of the transition metal complex (A) and of the iron complex (B) of the catalyst composition can be carried out using the same activator or activator mixture or different activators. It is often advantageous to use the same activator (C) for both the catalysts (A) and (B).

The activator or activators (C) can in each case be used in any amounts based on the complexes (A) and (B) of the catalyst composition of the invention. They are preferably used in an excess or in stoichiometric amounts, in each case based on the complex (A) or (B) which they activate. The amount of activating compound(s) to be used depends on the type of the activator (C). In general, the molar ratio of transition metal complex (A) to activating compound (C) can be from 1:0.1 to 1:10000, preferably from 1:1 to 1:2000. The molar ratio of iron complex (B) to activating compound (C) is also usually in the range from 1:0.1 to 1:10000, preferably from 1:1 to 1:2000.

Suitable compounds (C) which are able to react with the transition metal complex (A) or the iron complex (B) to convert it into a catalytically active or more active compound are, for example, compounds such as an aluminoxane, a strong uncharged Lewis acid, an ionic compound having a Lewis-acid cation or an ionic compound containing a Brönsted acid as cation.

As aluminoxanes, it is possible to use, for example, the compounds described in WO 00/31090. Particularly useful aluminoxanes are open-chain or cyclic aluminoxane compounds of the general formula (X) or (XI)

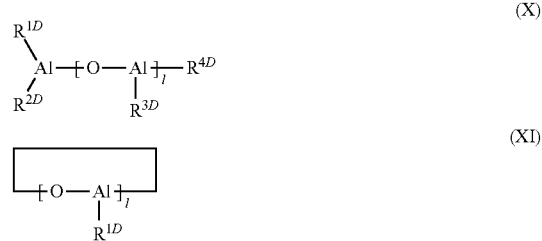

where $R^{1D}$-$R^{4D}$ are each, independently of one another, a $C_1$-$C_6$-alkyl group, preferably a methyl, ethyl, butyl or isobutyl group and l is an integer from 1 to 40, preferably from 4 to 25.

These oligomeric aluminoxane compounds are usually prepared by controlled reaction of a solution of a trialkylaluminum, in particular trimethylaluminum, with water. In general, the oligomeric aluminoxane compounds obtained are in the form of mixtures of both linear and cyclic chain molecules of various lengths, so that l is to be regarded as a mean. The aluminoxane compounds can also be present in admixture with other metal alkyls, usually aluminum alkyls. Aluminoxane preparations suitable as component (C) are commercially available.

Furthermore modified aluminoxanes in which some of the hydrocarbon radicals have been replaced by hydrogen atoms or alkoxy, aryloxy, siloxy or amide radicals can also be used in place of the aluminoxane compounds of the formula (X) or (XI) as component (C). A further class are hydroxyaluminoxanes; such compounds and their use in olefin polymerization are described, for example, in WO 00/24787.

It has been found to be advantageous to use the transition metal complex A) or the iron complex B) and the aluminoxane compounds in such amounts that the atomic ratio of aluminum from the aluminoxane compounds including any aluminum alkyl still present to the transition metal from the transition metal complex (A) is in the range from 1:1 to 2000:1, preferably from 10:1 to 500:1 and in particular in the range from 20:1 to 400:1. The atomic ratio of aluminum from the aluminoxane compounds including any aluminum alkyl still present to the iron from the iron complex (B) is usually in the range from 1:1 to 2000:1, preferably from 10:1 to 500:1 and in particular in the range from 20:1 to 400:1.

As strong, uncharged Lewis acids, preference is given to compounds of the general formula (XII)

$$M^{2D}X^{1D}X^{2D}X^{3D} \quad (XII)$$

where $M^{2D}$ is an element of group 13 of the Periodic Table of the Elements, in particular B, Al or Ga, preferably B, $X^{1D}$, $X^{2D}$ and $X^{3D}$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl part and from 6 to 20 carbon atoms in the aryl part or fluorine, chlorine, bromine or iodine, in particular haloaryls, preferably pentafluorophenyl.

Further examples of strong, uncharged Lewis acids are given in WO 00/31090. Suitable compounds (C) are preferably prepared by reaction of aluminum or boron compounds of the formula (XII) with water, alcohols, phenol derivatives, thiophenol derivatives or aniline derivatives, with halogenated and especially perfluorinated alcohols and phenols being of particular importance. Examples of particularly useful compounds are pentafluorophenol, 1,1-bis(pentafluorophenyl)methanol and 4-hydroxy-2,2',3,3',4',5,5',6,6'-nonafluorobiphenyl. Examples of combinations of compounds of the formula (XII) with Broenstedt acids are, in particular, trimethylaluminum/pentafluorophenol, trimethylaluminum/1-bis(pentafluorophenyl)methanol, trimethylaluminum/4-hydroxy-2,2',3,3',4',5,5',6,6'-nonafluorobiphenyl, triethylaluminum/pentafluorophenol and triisobutylaluminum/pentafluorophenol and triethylaluminum/4,4'-dihydroxy-2,2',3,3',5,5',6,6'-octafluorobiphenyl hydrate. Particularly useful as component (C) are boranes and boroxins such as trialkylborane, triarylborane or trimethylboroxin. Particular preference is given to using boranes which bear at least two perfluorinated aryl radicals. Particular preference is given to compounds of the general formula (XII) in which $X^{1D}$, $X^{2D}$ and $X^{3D}$ are identical, for example triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane or tris(3,4,5-trifluorophenyl)borane. Preference is given to using tris(pentafluorophenyl)borane.

In further suitable aluminum and boron compounds of the formula (XII), $R^{1D}$ is an OH group, such as, for example, in boronic acids and borinic acids. Particular mention may be made of borinic acids having perfluorinated aryl radicals, for example $(C_6F_5)_2BOH$.

Strong uncharged Lewis acids suitable as activating compounds (C) also include the reaction products of the reaction of a boronic acid with two equivalents of an aluminum trialkyl or the reaction products of the reaction of an aluminum trialkyl with two equivalents of an acidic fluorinated, in particular perfluorinated, carbon compound such as pentafluorophenol or bis(pentafluorophenyl)borinic acid.

Suitable ionic compounds having Lewis-acid cations include salt-like compounds of the cation of the general formula (XIII)

$$[((M^{3D})^{a+})Q_1Q_2\ldots Q_z]^{d+} \quad (XIII)$$

where $M^{3D}$ is an element of groups 1 to 16 of the Periodic Table of the Elements, $Q_1$ to $Q_z$ are simply negatively charged radicals such as $C_1$-$C_{28}$-alkyl, $C_6$-$C_{15}$-aryl, alkylaryl, arylalkyl, haloalkyl, haloaryl each having from 6 to 20 carbon atoms in the aryl part and from 1 to 28 carbon atoms in the alkyl part, $C_3$-$C_{10}$-cycloalkyl which may bear $C_1$-$C_{10}$-alkyl groups as substituents, halogen, $C_1$-$C_{28}$-alkoxy, $C_6$-$C_{15}$-aryloxy, silyl or mercaptyl groups, a is an integer from 1 to 6 and z is an integer from 0 to 5, d corresponds to the difference a-z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinaing counterions, in particular boron compounds as are also mentioned in WO 91/09882, preferably tetrakis(pentafluorophenyl)borate.

Salts having noncoordinating anions can also be prepared by combining a boron or aluminum compound, e.g. an aluminum alkyl, with a second compound which can react to link two or more boron or aluminum atoms, e.g. water, and a third compound which forms with the boron or aluminium compound an ionizing ionic compound, e.g. triphenylchloromethane, or optionally a base, preferably an organic nitrogen-containing base, for example an amine, an aniline derivative or a nitrogen heterocycle. In addition, a fourth compound which likewise reacts with the boron or aluminum compound, e.g. pentafluorophenol, can be added.

Ionic compounds containing Brönsted acids as cations preferably likewise have noncoordinating counterions. As Brönsted acid, particular preference is given to protonated amine or aniline derivatives. Preferred cations are N,N-dimethylanilinium, N,N-dimethylcyclohexylammonium and N,N-dimethylbenzylammonium and also derivatives of the latter two.

Compounds containing anionic boron heterocycles as are described in WO 9736937 are also suitable as component (C), in particular dimethylanilinium boratabenzenes or trityl boratabenzenes.

Preferred ionic compounds C) contain borates which bear at least two perfluorinated aryl radicals. Particular preference is given to N,N-dimethylanilinium tetrakis(pentafluorophenyl)borate and in particular N,N-dimethylcyclohexylammonium tetrakis(pentafluorophenyl)borate, N,N-dimethylbenzylammonium tetrakis(pentafluorophenyl)borate or trityl tetrakispentafluorophenylborate.

It is also possible for two or more borate anions to be joined to one another, as in the dianion $[(C_6F_5)_2B—C_6F_4—B(C_6F_5)_2]^{2-}$, or the borate anion can be bound via a bridge to a suitable functional group on the support surface.

Further suitable activating compounds (C) are listed in WO 00/31090.

The amount of strong, uncharged Lewis acids, ionic compounds having Lewis-acid cations or ionic compounds containing Brönsted acids as cations is preferably from 0.1 to 20 equivalents, more preferably from 1 to 10 equivalents and particularly preferably from 1 to 2 equivalents, based on the transition metal complex (A) or the iron complex (B).

Suitable activating compounds (C) also include boron-aluminum compounds such as di[bis(pentafluorophenylboroxy)]methylalane. Examples of such boron-aluminum compounds are those disclosed in WO 99/06414.

It is also possible to use mixtures of all the abovementioned activating compounds (C). Preferred mixtures comprise aluminoxanes, in particular methylaluminoxane, and an ionic compound, in particular one containing the tetrakis(pentafluorophenyl)borate anion, and/or a strong uncharged Lewis acid, in particular tris(pentafluorophenyl)borane or a boroxin.

Both the transition metal complex (A) or the iron complex (B) and the activating compounds (C) are preferably used in a solvent, preferably an aromatic hydrocarbon having from 6 to 20 carbon atoms, in particular xylenes, toluene, pentane, hexane, heptane or a mixture thereof.

A further possibility is to use an activating compound (C) which can simultaneously be employed as support (D). Such systems are obtained, for example, from an inorganic oxide treated with zirconium alkoxide and subsequent chlorination, e.g. by means of carbon tetrachloride. The preparation of such systems is described, for example, in WO 01/41920.

Combinations of the preferred embodiments of (C) with the preferred embodiments of (A) and/or (B) are particularly preferred.

As joint activator (C) for the catalyst component (A) and (B), preference is given to using an aluminoxane. Preference is also given to the combination of salt-like compounds of the cation of the general formula (XIII), in particular N,N-dimethylanilinium tetrakis(pentafluorophenyl)borate, N,N-dimethylcyclohexylammonium tetrakis(pentafluorophenyl)borate, N,N-dimethylbenzylammonium tetrakis(pentafluorophenyl)borate or trityl tetrakispentafluorophenylborate, as activator (C) for hafnocenes (A), in particular in combination with an aluminoxane as activator (C) for the iron complex (B).

Further particularly useful joint activators (C) are the reaction products of aluminum compounds of the formula (XII) with perfluorinated alcohols and phenols.

To enable the transition metal complex (A) and the iron complex (B) to be used in polymerization processes in the gas phase or in suspension, it is often advantageous to use the complexes in the form of a solid, i.e. for them to be applied to a solid support (D). Furthermore, the supported complexes have a high productivity. The transition metal complexes (A) and/or the iron complex (B) can therefore also optionally be immobilized on an organic or inorganic support (D) and be used in supported form in the polymerization. This enables, for example, deposits in the reactor to be avoided and the polymer morphology to be controlled. As support materials, preference is given to using silica gel, magnesium chloride, aluminum oxide, mesoporous materials, aluminosilicates, hydrotalcites and organic polymers such as polyethylene, polypropylene, polystyrene, polytetrafluoroethylene or polymers bearing polar functional groups, for example copolymers of ethene and acrylic esters, acrolein or vinyl acetate.

Particular preference is given to a catalyst system comprising at least one transition metal complex (A), at least one iron complex (B), at least one activating compound (C) and at least one support component (D).

The preferred catalyst composition according to the invention comprises one or more support components. It is possible for both the transition metal component (A) and the iron complex (B) to be supported, or only one of the two components can be supported. In a preferred embodiment, both the components (A) and (B) are supported. The two components (A) and (B) can in this case be applied to different supports or together on a joint support. The components (A) and (B) are preferably applied to a joint support in order to ensure a relatively close spatial proximity of the various catalyst centers and thus to ensure good mixing of the different polymers formed.

To prepare the catalyst systems of the invention, preference is given to immobilizing one of the components (A) and one of the components (B) and/or activator (C) or the support (D) by physisorption or else by means of a chemical reaction, i.e. covalent binding of the components, with reactive groups on the support surface.

The order in which support component D), transition metal complex (A), iron complex (B) and the activating compounds (C) are combined is in principle immaterial. After the individual process steps, the various intermediates can be washed with suitable inert solvents such as aliphatic or aromatic hydrocarbons.

Transition metal complex (A), iron complex (B) and the activating compound (C) can be immobilized independently of one another, e.g. in succession or simultaneously. Thus, the support component (D) can firstly be brought into contact with the activating compound or compounds (C) or the support component (D) can firstly be brought into contact with the transition metal complex (A) and/or the iron complex (B). Preactivation of the transition metal complex A) by means of one or more activating compounds (C) prior to mixing with the support (D) is also possible. The iron component can, for example, be reacted simultaneously with the transition metal complex with the activating compound (C), or can be preactivated separately by means of the latter. The preactivated iron complex (B) can be applied to the support before or after the preactivated transition metal complex (A). In one possible embodiment, the transition metal complex (A) and/or the iron complex (B) can also be prepared in the presence of the support material. A further method of immobilization is prepolymerization of the catalyst system with or without prior application to a support.

The immobilization is generally carried out in an inert solvent which can be removed by filtration or evaporation after the immobilization. After the individual process steps, the solid can be washed with suitably inert solvents such as aliphatic or aromatic hydrocarbons and dried. However, the use of the still moist, supported catalyst is also possible.

In a preferred method of preparing the supported catalyst system, at least one iron complex (B) is brought into contact with an activated compound (C) and subsequently mixed with the dehydrated or passivated support material (D). The transition metal complex (A) is likewise brought into contact with at least one activating compound (C) in a suitable solvent, preferably giving a soluble reaction product, an adduct or a mixture. The preparation obtained in this way is then mixed with the immobilized iron complex, which is used directly or after the solvent has been separated off, and the solvent is completely or partly removed. The resulting supported catalyst system is preferably dried to ensure that all or most of the solvent is removed from the pores of the support material. The supported catalyst is preferably obtained as a free-flowing powder. Examples of the industrial implementation of the above process are described in WO 96/00243, WO 98/40419 or WO 00/05277. A further preferred embodiment comprises firstly producing the activating compound (C) on the support component (D) and subsequently bringing this supported compound into contact with the transition metal complex (A) and the iron complex (B).

As support component (D), preference is given to using finely divided supports which can be any organic or inorganic solid. In particular, the support component (D) can be a porous support such as talc, a sheet silicate such as montmorillonite, mica or an inorganic oxide or a finely divided polymer powder (e.g. polyolefin or a polymer having polar functional groups). An inorganic support material can also be chemically modified. For example, treatment of silica gel with $NH_4SiF_6$ or other fluorinating agents leads to fluorination of the silica gel surface, or treatment of silica gels with silanes containing nitrogen-, fluorine- or sulfur-containing groups leads to correspondingly modified silica gel surfaces.

The support materials used preferably have a specific surface area in the range from 10 to 1000 m²/g, a pore volume in the range from 0.1 to 5 ml/g and a mean particle size of from 1 to 500 μm. Preference is given to supports having a specific surface area in the range from 50 to 700 m²/g, a pore volume in the range from 0.4 to 3.5 ml/g and a mean particle size in the range from 5 to 350 μm. Particular preference is given to supports having a specific surface area in the range from 200 to 550 m²/g, a pore volume in the range from 0.5 to 3.0 ml/g and a mean particle size of from 10 to 150 μm.

The transition metal complex (A) is preferably applied in such an amount that the concentration of the transition metal from the transition metal complex (A) in the finished catalyst system is from 1 to 200 μmol, preferably from 5 to 100 μmol and particularly preferably from 10 to 70 μmol, per g of support (D). The iron complex (B) is preferably applied in such an amount that the concentration of iron from the iron complex (B) in the finished catalyst system is from 1 to 200 μmol, preferably from 5 to 100 μmol and particularly preferably from 10 to 70 μmol, per g of support (D).

An inorganic support can be subjected to a thermal treatment, e.g. to remove adsorbed water. Such a drying treatment is generally carried out at temperatures in the range from 50 to 1000° C., preferably from 100 to 600° C., with drying at from 100 to 200° C. preferably being carried out under reduced pressure and/or under a blanket of inert gas (e.g. nitrogen), or the inorganic support can be calcined at temperatures of from 200 to 1000° C. to produce the desired structure of the solid and/or set the desired OH concentration on the surface. The support can also be treated chemically using customary desiccants such as metal alkyls preferably aluminum alkyls, chlorosilanes or $SiCl_4$, or else methylaluminoxane. Appropriate treatment methods are described, for example, in WO 00/31090. Organic support materials are preferably likewise freed of adhering moisture, solvent residues or other impurities by appropriate purification and drying operations before use.

Inorganic oxides suitable as support component (D) may be found among the oxides of elements of groups 2, 3, 4, 5, 13, 14, 15 and 16 of the Periodic Table of the Elements. Examples of oxides preferred as supports include silicon dioxide, aluminum oxide and mixed oxides of the elements calcium, aluminum, silicon, magnesium or titanium and also corresponding oxide mixtures. Other inorganic oxides which can be used alone or in combination with the abovementioned preferred oxidic supports are, for example, MgO, CaO, $AlPO_4$, $ZrO_2$, $TiO_2$, $B_2O_3$ or mixtures thereof. Further preferred inorganic support materials are inorganic halides such as $MgCl_2$ or carbonates such as $Na_2CO_3$, $K_2CO_3$, $CaCO_3$, $MgCO_3$, sulfates such as $Na_2SO_4$, $Al_2(SO_4)_3$, $BaSO_4$, nitrates such as $KNO_3$, $Mg(NO_3)_2$ or $Al(NO_3)_3$.

As solid support materials (D) for catalysts for olefin polymerization, preference is given to using silica gels since particles whose size and structure make them suitable as supports for olefin polymerization can be produced from this material. Spray-dried silica gels, which are spherical agglomerates of relatively small granular particles, i.e. primary particles, have been found to be particularly useful. The silica gels can be dried and/or calcined before use.

Further preferred supports (D) are hydrotalcites and calcined hydrotalcites. In mineralogy, hydrotalcite is a natural mineral having the formula $$Mg_6Al_2(OH)_{16}CO_3 \cdot 4H_2O$$

whose structure is derived from that of brucite $Mg(OH)_2$. Brucite crystallizes in a sheet structure with the metal ions in octahedral holes between two layers of close-packed hydroxyl ions, with only every second layer of the octahedral holes being occupied. In hydrotalcite, some magnesium ions are replaced by aluminum ions, as a result of which the packet of layers gains a positive charge. This is balanced by the anions which are located together with water of crystallization in the layers in-between.

Such sheet structures are found not only in magnesium-aluminum-hydroxides, but generally in mixed metal hydroxides of the general formula $$M(II)_{2x}^{2+}M(III)_2^{3+}(OH)_{4x+4} \cdot A_{2/n}^{n-} \cdot zH_2O$$

which have a sheet structure and in which M(II) is a divalent metal such as Mg, Zn, Cu, Ni, Co, Mn, Ca and/or Fe and M(III) is a trivalent metal such as Al, Fe, Co, Mn, La, Ce and/or Cr, x is a number from 0.5 to 10 in steps of 0.5, A is an interstitial anion and n is the charge on the interstitial anion which can be from 1 to 8, usually from 1 to 4, and z is an integer from 1 to 6, in particular from 2 to 4. Possible interstitial anions are organic anions such as alkoxide anions, alkyl ether sulfates, aryl ether sulfates or glycol ether sulfates, inorganic anions such as, in particular, carbonate, hydrogen carbonate, nitrate, chloride, sulfate or $B(OH)_4^-$ or polyoxometal anions such as $Mo_7O_{24}^{6-}$ or $V_{10}O_{28}^{6-}$. However, a mixture of a plurality of such anions is also possible.

Accordingly, all such mixed metal hydroxides having a sheet structure should be regarded as hydrotalcites for the purposes of the present invention.

Calcined hydrotalcites can be prepared from hydrotalcites by calcination, i.e. heating, by means of which, inter alia, the desired hydroxide group content can be set. In addition, the crystal structure also changes. The preparation of the calcined hydrotalcites used according to the invention is usually carried out at temperatures above 180° C. Preference is given to calcination for a period of from 3 to 24 hours at temperatures of from 250° C. to 1000° C., in particular from 400° C. to 700° C. It is possible for air or inert gas to be passed over the solid or for a vacuum to be applied at the same time. The calcined hydrotalcites used as component (D) are thus mixed oxides of the divalent and trivalent metals M(II) and M(III), with the molar ratio of M(II) to M(III) generally being in the range from 0.5 to 10, preferably from 0.75 to 8 and in particular from 1 to 4. Furthermore, normal amounts of impurities, for example Si, Fe, Na, Ca or Ti and also chlorides and sulfates, can also be present.

Preferred calcined hydrotalcites (D) are mixed oxides in which M(II) is magnesium and M(III) is aluminum. Such aluminum-magnesium mixed oxides are obtainable from Condea Chemie GmbH (now Sasol Chemie), Hamburg under the trade name Puralox Mg.

The hydrotalcites, calcined hydrotalcites or silica gels used are generally used as finely divided powders having a mean particle diameter D50 of from 5 to 200 μm, preferably from 10 to 150 μm, particularly preferably from 15 to 100 μm and in particular from 20 to 70 μm, and usually have pore volumes of from 0.1 to 10 cm³/g, preferably from 0.2 to 5 cm³/g, and specific surface areas of from 30 to 1000 m²/g, preferably from 50 to 800 m²/g and in particular from 100 to 600 m²/g. The catalyst system may further comprise, as additional component (E), a metal compound of the general formula (XX), $$M^G(R^{1G})_{rG}(R^{2G})_{sG}(R^{3G})_{tG} \qquad (XX)$$

where
$M^G$ is Li, Na, K, Be, Mg, Ca, Sr, Ba, boron, aluminum, gallium, indium, thallium, zinc, in particular Li, Na, K, Mg, boron, aluminum or Zn,
$R^{1G}$ is hydrogen, $C_1$-$C_{10}$-alkyl, $C_6$-$C_{15}$-aryl, alkylaryl or arylalkyl each having from 1 to 10 carbon atoms in the alkyl part and from 6 to 20 carbon atoms in the aryl part, $R^{2G}$ and $R^{3G}$ are each hydrogen, halogen, $C_1$-$C_{10}$-alkyl, $C_6$-$C_{15}$-aryl, alkylaryl, arylalkyl or alkoxy each having from 1 to 20 carbon atoms in the alkyl part and from 6 to 20 carbon atoms in the aryl part, or alkoxy together with $C_1$-$C_{10}$-alkyl or $C_6$-$C_{15}$-aryl, $r^G$ is an integer from 1 to 3
and
$s^G$ and $t^G$ are integers from 0 to 2, with the sum $r^G+s^G+t^G$ corresponding to the valence of $M^G$, where the component (E) is usually not identical to the component (C). It is also possible to use mixtures of various metal compounds of the formula (XX).

Among the metal compounds of the general formula (XX), preference is given to those in which
$M^G$ is lithium, magnesium, boron or aluminum and
$R^{1G}$ is $C_1$-$C_{20}$-alkyl.

Particularly preferred metal compounds of the formula (XX) are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, in particular n-butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

When a metal compound (E) is used, it is preferably present in the catalyst system in such an amount that the molar ratio of $M^G$ from formula (XX) to the sum of the transition metals from the transition metal complex (A) and the iron complex (B) is from 3000:1 to 0.1:1, preferably from 800:1 to 0.2:1 and particularly preferably from 100:1 to 1:1.

In general, the metal compound (E) of the general formula (XX) is used as constituent of a catalyst system for the polymerization or copolymerization of olefins. Here, the metal compound (E) can, for example, be used for preparing a catalyst solid comprising the support (D) and/or be added during or shortly before the polymerization. The metal compounds (E) used can be identical or different. It is also possible, particularly when the catalyst solid contains no activating component (C), for the catalyst system to further comprise, in addition to the catalyst solid, one or more activating compounds (C) which are identical to or different from any compounds (E) present in the catalyst solid.

The component E) can likewise be reacted in any order with the components (A), (B) and optionally (C) and (D). The component (A) can, for example, be brought into contact with the component(s) (C) and/or (D) either before or after being brought into contact with the olefins to be polymerized. Preactivation by means of one or more components (C) prior to mixing with the olefin and further addition of the same or another component (C) and/or (D) after this mixture has been brought into contact with the olefin is also possible. Preactivation is generally carried out at temperatures of 10-100° C., preferably 20-80° C.

In another preferred embodiment, a catalyst solid is prepared from the components (A), (B), (C) and (D) as described above and this is brought into contact with the component (E) during, at the commencement of or shortly before the polymerization.

Preference is given to firstly bringing (E) into contact with the α-olefin to be polymerized and subsequently adding the catalyst solid comprising the components (A), (B), (C) and (D) as described above.

In a further, preferred embodiment, the support (D) is firstly brought into contact with the component (E), and the components (A) and (B) and any further activator (C) are then dealt with as described above.

It is also possible for the catalyst system firstly to be prepolymerized with α-olefins, preferably linear $C_2$-$C_{10}$-1-alkenes and in particular ethylene or propylene, and the resulting prepolymerized catalyst solid then to be used in the actual polymerization. The mass ratio of catalyst solid used in the prepolymerization to a monomer polymerized onto it is usually in the range from 1:0.1 to 1:1000, preferably from 1:1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the catalyst system. The molar ratio of additives to the sum of transition metal compound (A) and iron complex (B) is usually from 1:1000 to 1000:1, preferably from 1:5 to 20:1.

The catalyst composition or catalyst system of the invention is suitable for preparing the polyethylene of the invention, which has advantageous use and processing properties.

To prepare the polyethylene of the invention, the ethylene is polymerized as described above with 1-alkenes having from 3 to 10 carbon atoms.

In the copolymerization process of the invention, ethylene is polymerized with 1-alkenes having from 3 to 12 carbon atoms. Preferred 1-alkenes are linear or branched $C_2$-$C_{10}$-1-alkenes, in particular linear $C_2$-$C_8$-1-alkenes such as ethene, propene, 1-butene, 1-pentene, 1-hexene, 1-heptene, 1-octene or branched $C_2$-$C_{10}$-1-alkenes such as 4-methyl-1-pentene. Particularly preferred 1-alkenes are $C_4$-$C_{10}$-1-alkenes, in particular linear $C_8$-$C_{10}$-1-alkenes. It is also possible to polymerize mixtures of various 1-alkenes. Preference is given to polymerizing at least one 1-alkene selected from the group consisting of ethene, propene, 1-butene, 1-pentene, 1-hexene, 1-heptene, 1-octene and 1-decene. Monomer mixtures containing at least 50 mol % of ethene are preferably used.

The process of the invention for polymerizing ethylene with 1-alkenes can be carried out using many industrially known polymerization methods at temperatures in the range from −60 to 350° C., preferably from 0 to 200° C. and particularly preferably from 25 to 150° C., and under pressures of from 0.5 to 4000 bar, preferably from 1 to 100 bar and particularly preferably from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes and gas-phase fluidized-bed processes are all possible. The polymerization can be carried out either batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gas-phase polymerization is generally carried out in the range from 30 to 125° C. at pressures of from 1 to 50 bar.

Among the abovementioned polymerization processes, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or supercondensed mode, in which part of the circulating gas is cooled to below the dew point and is recirculated as a two-phase mixture to the reactor. Furthermore, it is possible to use a multizone reactor in which the two polymerization zones are linked to one another and the polymer is passed alternately through these two zones a number of times. The two zones can also have different polymerization conditions. Such a reactor is described, for example, in WO 97/04015. The different or identical polymerization processes can also, if desired, be connected in series so as to form a polymerization cascade, for example as in the Hostalen® process. Furthermore, molar mass regulators, for example hydrogen, or customary additives such as antistatics can also be used in the polymerizations. Hydrogen can especially be used to enhance the activity of the hafnocene (A). The hydrogen and increased temperature usually lead to lower z-average molar mass.

The preparation of the polyethylene of the invention in the reactor reduces the energy consumption, requires no subsequent blending processes and makes simple control of the molecular weight distributions and the molecular weight fractions of the various polymers possible. In addition, good mixing of the polyethylene is achieved.

A pipe, suitably a steel pipe, having a multilayered coating as shown in FIG. 2 and encompassing the adhesive composition of the present invention in at least one layer, is further object of the invention. In summary, the adhesive composition of the present invention distinguishes by virtue of its increased peeling strength, especially at elevated temperature of 70° C. (and above), its cohesive mode of fracture, its excellent processing behaviour due to a low G'storage modulus indicating considerable strength of the extruded film material, little neck-in tendency upon film extrusion (side extrusion/wrapping called sometimes in relation to pipe coating), excellent sealing with/adhesiveness on the neighbouring epoxy layer and in particular the outer polyethylene mantle once applied to the pipe, which inter alia is due to its very low $\eta_0$ (zero shear viscosity) and a low contents of grafted maleic acid. The latter minimizes moisture absorption as a further factor promoting loss in adhesive strength over time.

A further object are electrically conductive cables or wires coated by the polyethylene, the component a) of the adhesive composition, of the present invention, wherein such coating may be multilayered or may comprise the polyethylene as the only coating applied. The reason for that is, that apart from its, despite a narrow MWD and small amount (<5%) of ultrahigh Mw weight polymer (with a polymer chain molecular weight>1 million), excellent processability by means of extrusion in view of process temperature and extrusion pressure applied, further is an unexpected low, temperature dependent shrinkage of the polyethylene material when cooling down. Hence, under environmental conditions, such fully exposed cable coating especially where applied to cables drawn above the soil and exposed to environmental extremes in hot and cold climates, combines a very good tensile strength with very little temperature dependent elongation or shrinkage, especially at temperatures in between −20° C. up to 60° C. or, taking account of extrusion coating processing first place, especially in between 40° C. up to 300° C. The low shrinkage upon cooling down is, without wanting to be limited by theory, caused by its narrow MWD and its optimal Vicat temperature. In addition, the polyethylene of the present invention distinguishes by high abrasion resistance, good FNCT properties of >200 h (Full Notch Creep Test, according to ISO 16770:2004 E, at 6 Mpa, 50° C.) and a further decreased water vapour permeability.

Based on said truly multitalented polyethylene ('polyethylene component a') of the present invention, there are still other objects. Its good dimensional stability, inclusive its temperature resistance and controlled stickiness at elevated temperatures >60° C., also makes the polyethylene suitable for use in other manufacturing processes for films, fibers or mouldings, in particular for rotomoulding of large solid, hollow articles wherein the polyethylene, typically a granulate, is required not to melt down during moulding but to show a controllable amount of ahesion to the walls of the rotating, heated moulding vessel. Rotomoulding, meaning products obtained by the process of rotomoulding, are a further preferred embodiment of the present invention.

The following examples illustrate the invention without restricting the scope of the invention.

EXAMPLES

Most specific methods have been described or referenced in the foregoing already.

NMR samples were placed in tubes under inert gas and, if appropriate, melted. The solvent signals served as internal standard in the $^1$H- and $^{13}$C-NMR spectra and their chemical shift was converted into the values relative to TMS.

The vinyl group content is determined by means of IR in accordance with ASTM D 6248-98. The branches/1000 carbon atoms are determined by means of $^{13}$C-NMR, as described by James. C. Randall, JMS-REV. Macromol. Chem. Phys., C29 (2&3), 201-317 (1989), and are based on the total content of $CH_3$ groups/1000 carbon atoms. The side chains larger than $CH_3$ and especially ethyl, butyl and hexyl side chain branches/1000 carbon atoms are likewise determined in this way. —The degree of branching in the individual polymer mass fractions is determined by the method of Holtrup (W. Holtrup, Makromol. Chem. 178, 2335 (1977)) coupled with $^{13}$C-NMR. —$^{13}$C-NMR high temperature spectra of polymer were acquired on a Bruker DPX-400 spectrometer operating at 100.61 MHz in the Fourier transform mode at 120° C.

The peak $S_{\delta\delta}$, [C. J. Carman, R. A. Harrington and C. E. Wilkes, Macromolecules, 10, 3, 536 (1977)] carbon was used as internal reference at 29.9 ppm. The samples were dissolved in 1,1,2,2-tetrachloroethane-d2 at 120° C. with a 8% wt/v concentration. Each spectrum was acquired with a 90° pulse, 15 seconds of delay between pulses and CPD (WALTZ 16) to remove 1H-13C coupling. About 1500-2000 transients were stored in 32K data points using a spectral window of 6000 or 9000 Hz. The assignments of the spectra, were made referring to Kakugo [M. Kakugo, Y. Naito, K. Mizunuma and T. Miyatake, Macromolecules, 15, 4, 1150, (1982)] and J. C. Randal, Macromol. Chem Phys., C29, 201 (1989).

The measurement of the storage modulus G' is carried out on a sample prepared in the following way: 2.2 g of the granulated material (in granulate or powder form) are weighted and used to fill a mould plate of 70×40×1 mm. The plate is placed in a press and heated up to 200° C., for 1 min under a pressure of 20-30 bar. After the temperature of 200° C. is reached, the sample is pressed at 100 bar for 4 min. After the end of the press-time, the material is cooled to room temperature and plates are removed from the form. A visual quality control test is performed at the pressed-plates, for possible cracks, impurities or inhomogeneity. The 25 mm diameter, 0.8-1 mm thick polymer discs are cut off from the pressed form and introduced in the rheometer for the dynamic mechanical analysis (frequency dependent) measurement.

The measurement of the elastic (G'), viscous (G") moduli and the complex viscosity as a function of frequency is performed in an Anton Paar MCR300 stress-controlled rotational rheometer. The device is equipped with a plate-plate geometry, i.e. two parallel discs of 24.975 mm radius each with a standard gap of 1.000 mm between them. For this gap ~0.5 ml of sample is loaded and heated at the measurement temperature (standard for PE: T=190° C.). The molten sample is kept at the test temperature for 5 min to achieve a homogeneous melting. Thereafter, for measurement periodic deformation with a strain amplitude of 0.05 (or 5%) is applied. The frequency may be varied, typically a low frequency of 0.01 rad/s (or 0.00159 Hz) is applied, as indicated in the results section. For each frequency, at least 2-3 oscillations with a stable measured value are acquired. The resulting shear stress amplitude and the phase lag from the applied deformation are acquired and used to calculate the frequency specific moduli and the complex viscosity, that is as a function of frequency.

The density [g/cm$^3$] was determined in accordance with ISO 1183.

The determination of the molar mass distributions and the means Mn, Mw, M$_z$ and Mw/Mn derived therefrom was carried out by high-temperature gel permeation chromatography using a method essentially described in DIN 55672-1:1995-02 issue February 1995. The methodological deviations applied in view of the mentioned DIN standard are as follows: Solvent was 1,2,4-trichlorobenzene (TCB), temperature of apparatus and solutions was 135° C. and as a concentration detector, use of a PolymerChar (Valencia, Paterna 46980, Spain) IR-4 infrared detector, capable for use with TCB.

A WATERS Alliance 2000 equipped with the following precolumn SHODEX UT-G and separation columns SHODEX UT 806 M (3×) and SHODEX UT 807 connected in series was used. The solvent was vacuum destilled under Nitrogen and was stabilized with 0.025% by weight of 2,6-di-tert-butyl-4-methylphenol. The flowrate used was 1 ml/min, the injection was 500 µl and polymer concentration was in the range of 0.01%<conc. <0.05% w/w. The molecular weight calibration was established by using monodisperse polystyrene (PS) standards from Polymer Laboratories (now Varian, Inc., Essex Road, Church Stretton, Shropshire, SY6 6AX,UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., & in J. Polymer Sci., Phys. Ed., 5, 753(1967)). The Mark-Houwing parameters used herefore were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTG-PC_V6.4.24 (hs GmbH, Hauptstraβe 36, D-55437 Ober-Hilbersheim) respectively.

For blending, the polymer components were homogenised and granulated on a twin screw kneading machine ZSK 57 (Werner & Pfleiderer) with screw combination 8A. The processing temperature was 220° C., the screw speed 250/min with maximum output at 20 kg/h. 1500 ppm Irganox B215 were optionally added to stabilize the polyethylenes. Optional to the method of grafting the complete blend immediately after mixing in the extruder according to the method described in the examples in EP-1299 438, here component a) was split and only a minor share of component a) was grafted with maleic acid anhydride was mixed with 0.5% maleic acid anhydride and reacted separately at 200° C. (per total weight of said share to be grafted), before being put into admixture with the remainder of the polyethylene component a) and the polar acrylate component b). The dimension of the die was approximately 30 cm.

The peel test for adhesion strength and mode of delamination was conducted according to DIN 30 670, except for the fact that the test body according to that standard has been replaced by a flat, rectangular strip of steel of about 160×22 mm, as to mimic the surface of a large industrial pipe. Prior to coating with the adhesive composition, the steel is coated in a heated press with BASF Basepox-powder varnish PE 50-1081 that is reacted 3 min. at 200° C. and immediately coated with a Hostaphan™-PE foil, under 35 bar pressure again. Layer thickness: 1. Epoxy-resin 0.2 mm, Adhesive of the present invention 0.2 mm, Hostaphan™-foil. The assembly according to which the test is conducted with such sample then is shown in FIG. 1: The metal strip (1) is placed in between two hooks 2a, 2b pulling through wholes in the steel on the outer surface of a peeling drum 3 and put under strain by a spring wire 7. An already detached, peeled off end of the Hostaphan PE foil 4 is fixated in one pulling clamp 5a,5b of the testing assembly, which is later to be moved, forcing further delamination of the PE foil 4 at a velocity of 100 mm/min. The drum 3 is further fixated through a holder or fork 6 onto a second pulling clamp 5b. The composite coating of an industrial steel pipe as claimed is shown in FIG. 2. All layers are applied in processing steps temporarily interspersed by seconds up to 1-2 minutes only in a manufacturing line onto a rotating, heated steel pipe body.

The stress crack resistance ('full notch creep test', FNCT)) was determined in [h] according to ISO16770:2004 E at a pressure of 6 Mbar at 50° C. in a 2% by weight solution of Akropal N (N=10) in water, including test specimen preparation as a compressed plate as described in ISO 16770:2004 E. —The time to failure is shortened by initiating a crack by means of the notch in 2% Arkopal solution as a stress crack promoting medium.

Abbreviations in the table below:
Cat. Catalyst
T(poly) Polymerisation temperature
$M_w$ Weight average molar mass
$M_n$ Number average molar mass
$M_z$ z-average molar mass
Density Polymer density
Prod. Productivity of the catalyst in g of polymer obtained per g of catalyst used per hour total-CH3 is the amount of CH3-groups per 1000C including end groups
Bis(n-butylcyclopentadienyl)hafnium dichloride is commercially available from Crompton Ltd.
Preparation of the Individual Components
2,6-Bis[1-(2-tert.butylphenylimino)ethyl]pyridine was prepared as in example 6 of WO 98/27124 and 2,6-Bis[1-(2-tert.butylphenylimino)ethyl]pyridine iron(II) dichloride was prepared as in example 15 of WO 98/27124.
2,6-Bis[1-(2,4,6-trimethylphenylimino)ethyl]pyridine was prepared as in example 1 of WO 98/27124 and reacted in an analogous manner with iron(II) chloride to give 2,6-Bis[1-(2,4,6-trimethylphenylimino)ethyl]pyridine iron(II) dichloride, as likewise disclosed in WO 98/27124.
2,6-Bis[1-(2,4-dichloro-6-methylphenylimino)ethyl]pyridine iron(II) dichloride was prepared according to the method of Qian et al., Organometallics 2003, 22, 4312-4321. Here, 65.6 g of 2,6-diacetylpyridine (0.4 mol), 170 g of 2,4-dichloro-6-methylaniline (0.483 mol), 32 g of silica gel type 135 and 160 g of molecular sieves (4A) were stirred in 1500 ml of toluene at 80° C. for 5 hours and a further 32 g of silica gel type 135 and 160 g of molecular sieves (4A) were subsequently added. The mixture was stirred at 80° C. for a further 8 hours, the insoluble solid was filtered off and washed twice with toluene. The solvent was distilled off from the filtrate obtained in this way, the residue was admixed with 200 ml of methanol and subsequently stirred at 55° C. for 1 hour.

The suspension formed in this way was filtered and the solid obtained was washed with methanol and freed of the solvent. This gave 95 g of 2,6-Bis[1-(2,4,6-trimethylphenylimino)ethyl]pyridine in 47% yield. The reaction with iron (11) chloride was carried out as described by Qian et al., Organometallics 2003, 22, 4312-4321.

2,6-Bis[1-(4,6-Dimethyl-2-chloro-phenylimino)ethyl]pyridine iron(II) dichloride was prepared in analogy to 2,6-Bis[1-(2,4-dichloro-6-methylphenylimino)ethyl]pyridine iron(II) dichloride as described above.

A. Preparation of the Mixed Catalyst Systems Employed for Synthesis of the Polyethylene Component a):

Example 1 a) Support Pretreatment

XPO-2107, a spray-dried silica gel from Grace, was calcinated at 600° C. for 6 hours and subsequently 252.2 g of the dried silica gel admixed with 164.5 ml of MAO (4.75 M in Toluol, 0.78 mol). The mixture was stirred for one hour, filtered, the solid washed with toluene and then died under reduced pressure.

b) Preparation of the Mixed Catalyst Systems

A mixture of 1.48 g (2.45 mmol) of 2,6-Bis[1-(2,4-dichloro-6-methylphenylimino)ethyl]pyridine iron(II) dichloride, 3.61 g (7.34 mmol) of bis(n-butylcyclopentadienyl)hafnium dichloride and 159.6 ml of MAO (4.75 M in toluene, 0.76 mol) was stirred at room temperature for 1 h and subsequently added while stirring to a suspension of 237.1 g of the pretreated support material a) in 800 ml of toluene. The mixture was stirred at room temperature for a further 3 hours, the resulting solid filtered off and washed with toluene. The solid was dried under reduced pressure until it was free-flowing. This gave 256.7 g of catalyst.

Example 2 a) Support Pretreatment

XPO-2107, a spray-dried silica gel from Grace, was calcinated at 600° C. for 6 hours.

b) Preparation of the Mixed Catalyst Systems

A mixture of 5.35 g (9.69 mmol) of 2,6-Bis[1-(2-tert.butylphenylimino)ethyl]pyridine iron(II) dichloride, 7.49 g (15.22 mmol) of bis(n-butylcyclopentadienyl)hafnium dichloride and 472 ml of MAO (4.75 M in toluene, 2.24 mol) was stirred at room temperature for 30 minutes and subsequently added while stirring to a suspension of 276.8 g of the pretreated support material a) during the course of 45 minutes ((Fe+Hf):Al=1:90). The solid was dried under reduced pressure until it was free-flowing. This gave 609 g of catalyst which still contained 31.5° A) by weight of solvent (based on the total weight and calculated on the basis of complete application of all components to the support).

Examples 3-5

Support pretreatment and preparation of the mixed catalyst systems were prepared essentially as described in example 1, except that 2,6-Bis[1-(4,6-Dimethyl-2-chloro-phenylimino) ethyl]pyridine iron(II) dichloride was employed instead as the iron catalyst complex.

Comparative Example C1 a) Support Pretreatment

XPO-2107, a spray-dried silica gel from Grace, was baked at 600° C. for 6 hours.

b) Preparation of the Mixed Catalyst Systems

A mixture of 0.99 g (1.755 mmol) of 2,6-Bis[1-(2,4,6-trimethylphenylimino)ethyl]pyridine iron(II) dichloride, 3.69 g (7.5 mmol) of bis(n-butylcyclopentadienyl)hafnium dichloride and 203.8 ml of MAO (4.75 M in toluene, 0.968 mol) was stirred at room temperature for one hour and subsequently added while stirring to a suspension of 125 g of the pretreated support material a) ((Fe+Hf):Al=1:105). The mixture was stirred for another 2 h, the solvent removed under reduced pressure and then the solid dried under reduced pressure until it was free-flowing. The resulting catalyst still contained 38.9% by weight of solvent (based on the total weight and calculated on the basis of complete application of all components to the support). —This comparative example demonstrates using an iron catalyst in a mixed hybrid system whose ligands are primary instead of tertiary alkyl, which catalyst fails and hence is not capable of providing the high vinyl group contents characteristic of the adhesive composition of the present invention. Use of exactly this iron catalyst is disclaimed for the purpose of the present invention.

B. Polymerization of the Catalysts

The polymerization was always carried out in a fluidized-bed reactor having a diameter of 0.5 m. The reaction temperature was in the range of 94-105° C., the output in the range of 3.1 to 3.8 kg/h, ethylene was dosed at 3-5 kg/h and 1-hexene at 50 to 100 g/h, hydrogen gas was metered at 0.5 to 1.5 l/h. The pressure in the reactor was 20 bar. 0.1 g of triisobutylaluminum per hour were metered in in each case, except for comparative examples where hydrogen was metered at about 3-4 l/h. More detailed information on representative, individual synthetic polymerization protocols is published in WO2005/103095. Catalysts employed were the catalysts from the examples 1-5 and comparative example C1. The properties of the polymers obtained are summarized in Table 1.

TABLE 1

| | Catalyst from Example | | | | | |
|---|---|---|---|---|---|---|
| | 1 | 2 | 3 | 4 | 5 | C1 |
| Density [g/cm$^3$] | 0.9434 | 0.9439 | 0.937 | 0.936 | 0.9374 | 0.9413 |
| Mw [g/mol] | 141769 | 126115 | 110318 | 95693 | 88352 | 240628 |
| Mw/Mn | 8.12 | 13.23 | 6.91 | 8.9 | 10.54 | 9.07 |
| Mz | 396696 | 380177 | 364625 | 280975 | 286554 | 1339939 |

TABLE 1-continued

| | Catalyst from Example | | | | | |
|---|---|---|---|---|---|---|
| | 1 | 2 | 3 | 4 | 5 | C1 |
| GPC % at molar mass 1Mio | 99.392 | 99.529 | — | — | — | 95.406 |
| –HC = CH2 [1/1000 C.] | 0.75 | 1.91 | 0.74 | 1.08 | 1.05 | 0.34 |
| >C = CH2 [1/1000 C.] | 0.15 | 0.2 | 0.25 | 0.25 | 0.26 | 0.17 |
| total-CH3 [1/1000 C.] | 4.3 | 6.5 | 8.2 | 10.6 | 9.3 | 5 |
| % (w/w) Hexene (=% butyl side chain) | 3.1 | 3.83 | 3.7 | 5.6 | 4.8 | 4.17 |
| $HLMI_{(21.6 Kg/190° C.)}$ [g/10 min.] | 22 | 43 | 75.8 | 85 | 73.5 | 11 |
| Intrinsic viscosity η [dl/g] | | | 1.7 | 1.66 | 1.6 | |
| CDBI [%] | | | 65 | 29 | <40 | |
| $MI_{(2.16 Kg/190° C.)}$ [g/10 min.] | | | | 2.49 | 2.3 | |

Example 6

The polyethylene copolymer from example 5 was used a component a) upon further blending with a polar ethylene-acrylat-copolymer, for manufacturing the inventive composition of the present invention and film extrusion as described above. The polyethylene from example 4 has an fairly monomodal mass distribution according to GPC analysis, though manufactured from a hybrid catalyst system which catalysts provide for essentially an inverse comonomer ratio. The blend composition worked was the following:

55% Polyethylen Copolymer of example 4
30% Ethylene-n-butylacrylate-Copolymer (15% n-butyl-acrylate, 85% ethylene)
15% Maleic Acid Anhydride (MA) grafted Polyethylene Copolymer of example 4 (0.5% MA, 99.5% Copolymer Exp. 4)

The blend's physical properties and performance test data are compilated in Table 2; for comparison, 30 parts of the ever same ethylene-n-butyl-acrylate copolymer used above was blended with 70 parts of i. a grafted bimodal LDPE copolymer (MI=1.3 g/10 min) product analogous to a commercial product from a competitor with the polyethylene component a) being manufactured by means of a single site catalyst in a reactor cascade process
ii. a grafted monomodal LDPE copolymer (MI=1.3 g/10 min.) synthesized by a single Phillips Cr-catalyst
iii. a grafted monomodal LDPE copolymer (MI=1.3 g/10 min.) synthesized by a single metallocene catalyst (Zirconocene); such blend was the commercial predecessor product of the present application.

In every case i-iii, the PE copolymer was grafted entirely with MA by the method described above.

TABLE 2

| Properties | Comp. Ex. C-i | C-ii | C-iii | Exp. 6 |
|---|---|---|---|---|
| Density [g/cm³] | 0.931 | 0.932 | 0.93 | 0.931 |
| MA content [%] | 0.08 | 0.08 | 0.08 | 0.08 |
| G'-Modul @0.01 (rad/s) [Pa] | 106 | 510 | 4.5 | 5.8 |
| Mw/Mn (only LDPE resin as used for blending) | 14 | 14 | 4 | 14 |
| MI(2.16 kg; 190° C.) [g/10 min] | 0.61 | 0.56 | 2.3 | 1.85 |
| HLMI (21.6 kg; 190° C.) [g/10 min] | 32.4 | 31.1 | 36.8 | 71.4 |
| Melt Flow Rate (HLMI:MI) | 53.1 | 55.5 | 16 | 38.6 |

TABLE 2-continued

| Properties | Comp. Ex. C-i | C-ii | C-iii | Exp. 6 |
|---|---|---|---|---|
| Moisture absorption (30 days; 80° C.; 100% rel. humidity) [%] | 0.3 | 0.3 | 0.3 | 0.3 |
| Peel strength [N/mm] | | No film extrusion feasible; snap off | | |
| At 23° C. | 36 | n.d. | 38 | 54 |
| At 70° C. | 20.4 | n.d. | 23 | 32.8 |
| At 85° C. | 11.2 | n.d. | 12.8 | 24.8 |
| At 95° C. | 6.8 | n.d. | 8.7 | 22.4 |
| Peeling mode | cohesive | — | cohesive | cohesive |
| Flat film lay width [mm] | 320 | n.d. | 270 | 350 |
| Neck-in (%-reduction of total width obtained from die) | 20 | n.d. | 32.5 | 12.5 |

Example 7

The polyethylene product from example 4, cp. Table 1, is used for rotomoulding of symmetrically shaped vessels having an even wall of constant thickness. Typically, Ziegler polyethylene products are used in this area such as the one cited below in the table, Microthene™ from Lyondell Industries, U.S.A. However the polyethylene from example 4 of the present invention, distinguishes by a much higher FNCT whilst being equally fit for rotomoulding, see table 3:

TABLE 3

| | Exp. 4 above, polyethylene of the present invention | Comparative example: Microthene MP643662 |
|---|---|---|
| FNCT (at 6 Mpa, 50° C.) | 275 h | 15 h |

As said above in the description, it is a general feature of the multipurpose polyethylene (i.e. 'polyethylene component a') of the present invention, as used here optionally as a non-blended base polymer for rotomoulding, that it will preferably and typically have a FNCT of at least 200 h (Full Notch Creep Test, according to ISO 16770:2004 E, at 6 Mpa, 50° C.) or higher.

Example 8

For extrusion coating of electrical cables, a further batch of a polyethylene according to the invention was polymerized essentially as described above (item B), with the same catalyst system employed for examples 3-5. The material thus obtained, its processing and material characteristics, were compared to a standard polyethylene polymer material used for coating electrical cables, Petrothene™ (Lyondell Industries U.S.A.). It was found that beside an excellent dimensional stability (low shrinkage), the polyethylene of the invention demonstrated easier processability (lower extrusion pressure/speed), a lower zero shear melt viscosity (not shown) and a higher ESCR value (Bell test) than the commercial standard material compared to, s. table 4.

TABLE 4

|  |  | Exp. 8 | Petrothene GA808091 |
|---|---|---|---|
| Density | [g/cm³] | 0.9365 | 0.9214 |
| Mw | [g/mol] | 94.000 | 110.000 |
| Mw/Mn | [—] | 9.4 | 14.4 |
| Intensified Bell test* | [h] | 4 | 2 |
| Screw speed# | [s-1] | 15.7 | 20.3 |
| Melt temperature# | [° C.] | 186 | 192 |
| Melt pressure# | [bar] | 40 | 48 |

Extrusion parameters, twin screw extruder
*'Bell test' means the ESCR testing method for flexible PE materials according to ASTM D-1693-01, Method A (3 mm width/0.6 mm notch/50° C.); the sample was prepared essentially as recommended in ASTM D-1693, sect.8.1 therein, only that for forced testing ('intensified Bell test'), additional thermal treatment of the sample took place during preparation. It is well known that ESCR values are strongly influenced by the thermal history of a sample; thermal pretreatment was conducted in the following way: The product was put in a kneadding machine (Brabander) for 1 h at 154° C. at 125 rpm. The material was then sheeted hot to 3 mm wide sample as prescribed, removed from the press and immediately chilled. Finally, the sample sheet was tempered at 70° C. for 16 h. Both the sample of the material form exp. 6 as well as the commercial, comparative material were treated in the same way.

The invention claimed is:

1. An adhesive polymer composition comprising
   a) 50%-95% by weight, of a polyethylene homo- and/or ethylene copolymer which is a copolymer of ethylene with $C_3$-$C_{20}$-alkene, which polyethylene has a molar mass distribution width $M_w/M_n$ of from 6 to 30, a density of from 0.93 to 0.955 g/cm³, a weight average molar mass $M_w$ of from 20,000 g/mol to 500,000 g/mol, has from 0.01 to 20 $CH_3$/1000 carbon atoms has a Mz from 200,000 to less than 1,000,000 g/mol, and has at least 0.6 vinyl groups/1000 carbon atoms;
   b) 5%-50% by weight, of a polar copolymer of ethylene with at least one comonomer which comonomer is selected from the group consisting of an acrylate and acrylic acid; and
   c) 1%-30% by weight, of a grafted polyethylene homo- and/or ethylene copolymer which is a copolymer of ethylene with $C_3$-$C_{20}$-alkene, which polyethylene has a molar mass distribution width $M_w/M_n$ of from 6 to 30, a density of from 0.93 to 0.955 g/cm³, a weight average molar mass $M_w$ of from 20,000 g/mol to 500,000 g/mol, has from 0.01 to 20 $CH_3$/1000 carbon atoms has a Mz from 200,000 to less than 1,000,000 g/mol, and has at least 0.6 vinyl groups/1000 carbon atoms,
   wherein the grafted polyethylene homo- and/or ethylene copolymer comprises polymer chains which have been grafted with 0.01% to 10% of ethylenically unsaturated dicarboxylic acids and/or dicarboxylic anhydrides, based on the total weight of the grafted polyethylene homo- and/or ethylene copolymer.

2. A composition according to claim 1, wherein said polyethylene component a) is a copolymer comprising at least one $C_3$-$C^{20}$-alkene monomer species in an amount of >3% based on the total weight of component a).

3. A composition according to claim 1, wherein the polyethylene a) has a vinyl group content of at least 0.9 vinyl groups/1000 C atoms and wherein the amount of the polyethylene component a) with a molar mass of below 1 Mio. g/mol, as determined by GPC, is above 95.5% by weight based on the weight of component a).

4. A composition according to claim 1, wherein the η(vis) value of the component a) is 0.3 to 7 dl/g, and wherein η(vis) is the intrinsic viscosity as determined according to ISO 1628-1 and -3 in Decalin at 135° C.

5. A composition according to claim 1, wherein the polyethylene a) has been prepared in a one-pot reaction.

6. A composition according to claim 5, wherein the polyethylene a) is obtained by polymerization in the presence of a catalyst composition comprising at least two different single-site polymerization catalysts, of which single-site catalyst A) is at least one polymerization catalyst based on a hafnocene (A) and single-site catalyst B) is at least one polymerization catalyst based on an iron component having a tridentate ligand bearing at least two aryl radicals with each bearing a halogen or tert. alkyl substituent in the ortho-position (B).

7. A composition according to claim 6, wherein the polyethylene a) is obtained by copolymerizing ethylene with one or several 1-alkenes of formula $R^1CH\!=\!CH_2$, wherein $R^1$ is an alkyl radical with 1 to 10 carbons at a temperature of from 20 to 200° C. and at a pressure of from 0.05 to 1 MPa.

8. A composition according to claim 1, wherein the $C_3$-$C_{20}$-alkene is a $C_3$-$C_{20}$-1-alkene.

9. A composition according to claim 1, wherein component a) has a $MFI_{(190/2.16Kg)}$ of from 0.1 to 10 g/10 min.

10. A composition according to claim 1, wherein the component b) is substantially a binary copolymer of ethylene and at least one alkyl-acrylate, wherein the alkyl is $C_1$ to $C_{10}$ alkyl and wherein the component b) has a $MFI_{(190/2.16\ Kg)}$ of from 1 to 3 g/10 min.

11. A composition according to claim 1, wherein the component b) is a copolymer made from ethylene and n-butyl-acrylate.

12. A composition according to claim 1, wherein component c) only is grafted with ethylenically unsaturated dicarboxylic acids and/or dicarboxylic anhydrides, with 0.05% to 5% of such dicarboxylic acids and/or anhydrides based on the total weight of the composition, and wherein component c) amounts to 5%-25% of the total weight of the composition.

13. A composition according to claim 12, wherein the ethylenically unsaturated dicarboxylic acid and/or dicarboxylic anhydride is maleic acid or maleic anhydride.

14. A film comprising a composition according to claim 1.

15. A film according to claim 14, which has been obtained by film extrusion through a die, said die having the dimensions of the film to be produced.

16. Cable or wire coated with the composition of claim 1.

* * * * *